US007259203B2

(12) United States Patent
Chou et al.

(10) Patent No.: US 7,259,203 B2
(45) Date of Patent: Aug. 21, 2007

(54) AQUEOUS NANOCOMPOSITE DISPERSIONS: PROCESSES, COMPOSITIONS, AND USES THEREOF

(75) Inventors: Chuen-Shyong Chou, Ambler, PA (US); Edward Ewart LaFleur, Holland, PA (US); Dennis Paul Lorah, Lansdale, PA (US); Robert Victor Slone, Quakertown, PA (US); Katerina Dukes Neglia, Kingsport, TN (US)

(73) Assignee: Rohm and Haas Company

( * ) Notice: Subject to any disclaimer, the term of this patent is extended or adjusted under 35 U.S.C. 154(b) by 257 days.

(21) Appl. No.: 10/972,946

(22) Filed: Oct. 25, 2004

(65) Prior Publication Data

US 2005/0059769 A1 Mar. 17, 2005

Related U.S. Application Data

(62) Division of application No. 09/954,132, filed on Sep. 17, 2001, now Pat. No. 6,838,507.

(60) Provisional application No. 60/234,263, filed on Sep. 21, 2000.

(51) Int. Cl.
*C08K 3/34* (2006.01)

(52) U.S. Cl. ...................... 524/445; 523/201; 501/125

(58) Field of Classification Search ................ 524/447, 524/445, 446

See application file for complete search history.

(56) References Cited

U.S. PATENT DOCUMENTS

| | | | | |
|---|---|---|---|---|
| 2,531,396 | A | 11/1950 | Carter et al. | 260/41.5 |
| 2,883,356 | A | 4/1959 | Gluesenkamp | 260/37 |
| 4,739,007 | A | 4/1988 | Okada et al. | 524/789 |
| 4,867,902 | A | 9/1989 | Russell | 252/186.23 |
| 4,889,885 | A | 12/1989 | Usuki et al. | 524/445 |
| 5,032,546 | A | 7/1991 | Giannelis et al. | 501/3 |
| 5,279,663 | A | 1/1994 | Kaliski | 106/486 |
| 5,780,376 | A | 7/1998 | Gonzales et al. | 501/146 |
| 5,837,763 | A | 11/1998 | Ferraro et al. | 524/449 |
| 5,883,173 | A | 3/1999 | Elspass et al. | 524/446 |
| 5,936,023 | A | 8/1999 | Kato et al. | 524/445 |
| 5,962,553 | A | 10/1999 | Ellsworth | 523/216 |
| 5,973,053 | A | 10/1999 | Usuki et al. | 524/445 |
| 5,998,528 | A | 12/1999 | Tsipursky et al. | 524/445 |
| 6,034,164 | A | 3/2000 | Elspass et al. | 524/445 |
| 6,057,035 | A | 5/2000 | Singh et al. | 428/403 |
| 6,838,507 | B2 * | 1/2005 | Chou et al. | 524/445 |
| 7,129,287 | B1 * | 10/2006 | Lee et al. | 524/445 |
| 2002/0086908 | A1 * | 7/2002 | Chou et al. | 516/98 |

FOREIGN PATENT DOCUMENTS

| | | |
|---|---|---|
| EP | 0846662 A2 | 6/1998 |
| GB | 2314335 | 12/1997 |
| JP | 94041346 | 2/1994 |
| WO | WO95/14733 | 6/1995 |
| WO | WO97/00910 | 1/1997 |
| WO | WO 00/29467 | 5/2000 |

OTHER PUBLICATIONS

Ugolstad, et al., "Swelling of Aqueos Dispersions of Polymer-Oligomer Particles. Preparation of Polymer Particles of Predetermined Particle Size Including Large Monodisperse Particles", pp. 83-93, Polymer Colloids II, R. M. Fitch ED, Plenum Press, NY 1980.

Xavier Kornmann, "Synthesis and Characterisation of Thermoset-Clay Nanocomposites", Lulea University of Technology, S-971 87, Lulea, Sweden, pp. 1-29, 1999.

Huang, et al., Synthesis and Characterization of PMMA Nanocomposites by Suspension and Emulsion Polymerization, Department of Polymer Science, University of Akron, 2000, pp. A-D.

Lee, et al., "Characterization of Epoxy-Clay Hybrid Composite Prepared by Emulsion Polymerization", Journal of Applied Polymer Science, vol. 68, 1998, pp. 1997-2005.

Lee, et al., "Preparation and Characterization of PMMA-Clay Hybrid Composite by Emulsion Polymerization", Journal of Applied Polymer Science, vol. 61, 1996, pp. 1117-1122.

Bhattacharyya, et al., Aqueous Polymerization on Clay Surfaces v. Role of Lattice Substitutes Iron in Montmorillonite in Polymerzation Methyl Methacrylate in the Presence of Thiourea, Journal of Polymer Science, vol. 28, pp. 2249-2254, 1990.

Bera, et al., "Water-Soluble Copolymers of Acrylamide with Diacetone-Acrylamide and N-t-Butylacrylamide on Aqueos Montmorillonite Surface, Synthesis and Characterization, European Polymer Journal, vol. 36, 2000, pp. 411-419."

Bera, et al., "Redox Polymerisation of Acrylamide on Aqueous Montmorillonite Surface: Kinetics and Mechanism of Enhanced Chain Growth", University of North Bengal, Darjeeling 734430, India, 1997.

Kirk-Othmer, "Surfactants", Concise Encyclopedia of Chemical Technology, 4th Ed., 1999, pp. 1949-1953.

Martin Grayson, Encyclopedia of Composite Materials and Components, 1983, pp. 324-340.

Kingery, et al., "Structure of Crystals", Introduction to Ceramics, 2nd Ed., 1960, pp. 77-80.

"Clay Mineralogy", www.pitt.edu/~harbert/courses/GEO0040/2C_CLAYS.html, 1997.

Lecture Notes for Clay Mineralogy, www.gly.uga.edu/schroeder/geo16550/CM20.html, 1997.

(Continued)

*Primary Examiner*—Katarzyna Wyrozebski
(74) *Attorney, Agent, or Firm*—Andrew E. C. Merriam

(57) ABSTRACT

Processes for utilizing various emulsion polymerization procedures for preparing aqueous nanocomposite dispersions are disclosed. The disclosed processes include both in-situ polymerizations in the presence of at least partially exfoliated unmodified clays as well as admixtures of polymer dispersions with at least partially exfoliated unmodified clay dispersions. The disclosed nanocomposite dispersions are useful for preparing a variety of materials, such as coatings, adhesives, caulks, sealants, plastics additives, and thermoplastic resins. Processes for preparing polymer clay nanocomposite powders and use of these powders as plastic resin and plastics additives are also disclosed.

20 Claims, No Drawings

OTHER PUBLICATIONS

"Soil Colloids: Their Nature and Practical Signifigance", www.agri.atu.edu/people/Hodgson/Soils/Chapter8.html, 1995.

Beall, et al., "Nanocomposites Produced Utilizing A Novel Ion-Dipole Clay Surface Modification", Chemistry and Technology of Polymer Additives, pp. 266-280, 1999.

Beall, et al., Nanocomposites Produced Utilizing a Novel Clay Surface Modification, pp. 1-14, 1999.

Ron Dagani, "Putting the "Nano" into Composites", C&EN Washington, Jun. 7, 1999, pp. 25-37.

Noh, et al., "Synthesis and Characterization of PS-clay Nanocomposite by Emulsion Polymerization", Polymer Bulletin, 42, (1999), pp. 619-626.

"Ion-Exchange Reaction", Encyclopedia Britannica, www.britannica.com/bcom/eb/article/printable/2/0,5722,118752,00.html, 1999.

* cited by examiner

AQUEOUS NANOCOMPOSITE DISPERSIONS: PROCESSES, COMPOSITIONS, AND USES THEREOF

This application is a divisional of prior U.S. application Ser. No. 09/954,132, filed Sep. 17, 2001, now U.S. Pat. No. 6,838,507 which claims priority from U.S. provisional application No. 60/234,263, filed Sep. 21, 2000.

The present invention relates generally to polymer clay aqueous nanocomposite dispersions and methods for making and using the same. More particularly, the present invention relates to methods of making polymer clay nanocomposites using unmodified clays in aqueous systems. This invention also relates to the use of these nanocomposite compositions as, for example, thermoplastic resins, capstock, coatings, sealants, caulks, adhesives, and as plastics additives.

Thermoplastic resins may be used as plastic materials either alone or in combination with other materials to form composites. Because plastics often are brittle or lack sufficient strength, however, there is a need to increase their mechanical properties.

One way of improving thermoplastic resins is by adding polymer particles to modify the mechanical and melt processing properties of thermoplastic resins. For example, polyvinyl chloride resin (hereafter "PVC") has a combination of properties that make it particularly suitable for use as a structural material. However, PVC may suffer from being brittle. To remedy this, PVC may be blended with polymer particles having a rubber phase to improve its impact strength (e.g., as an impact-modifier). Typical uses for impact-modified PVC include siding for buildings, shutters, technical profiles for window and door frames, rain carrying systems (e.g., gutters and downspouts), and fencings. Although impact modifiers may improve the impact-strength of plastic articles, there is a concomitant decrease in tensile and flexural strength (i.e., modulus) of the modified plastic. Thus, there is a need for a plastics additive in plastic articles such as thermoplastic resins that provide impact strength while minimizing the reduction in modulus.

In composite materials, certain thermoplastics, such as extrudable thermoplastic resins with a co-extruded capstock layer, may be used to provide a tough and strong outer layer for articles having a weaker plastic substrate. Examples of extrudable thermoplastic resins include, but are not limited to, PVC, chlorinated polyvinylchloride ("CPVC"), high impact polystyrene ("HIPS"), polypropylene ("PP") and acrylonitrile-butadiene-styrene ("ABS"). To protect these thermoplastic resins from weathering and/or physical impacts, a capstock layer such as, for example, an acrylic material, may be coextruded atop the substrate, such as PVC. The resultant composite material has improved scratch resistance, impact strength, tensile strength, adhesion, appearance, and weatherability. The capstock layers are typically much thinner than the substrate plastic and may range from 10 to 25% of the total thickness of the composite (i.e., the composite being defined as the combination of the capstock layer(s) and the substrate plastic).

Capstock materials generally possess a certain combination of processing properties and other physical, chemical, and aesthetic properties, including exceptional weathering characteristics such as excellent color retention and high mechanical (e.g., impact and tensile) strength. Further, capstock materials typically do not adversely affect those properties which make PVC such a widely used building material. In particular, capstock compositions are typically strong and tough to provide these physical property improvements. Although latex polymers, such as multi-stage "core-shell" acrylic polymers may be used as the modifiers in the capstock layer, there is a continuing need for property improvements.

One way of improving polymer properties is by adding a clay material to polymers to form composite materials. However, incorporating clays into polymers may not provide a desirable improvement in the physical properties, particularly mechanical properties, of the polymer. This may be due, for example, to the lack of affinity between the clay and the polymer at the interface, or the boundary, between the clay and polymer within the material. In this connection, affinity between the clay and the polymer may improve the physical properties of the resulting nanocomposite by allowing the clay material to uniformly disperse throughout the polymer. The relatively large surface area of the clay, if uniformly dispersed, may provide more interfaces between the clay and polymer, and may subsequently improve the physical properties, by reducing the mobility of the polymer chains at these interfaces. By contrast, a lack of affinity between the clay and polymer may adversely affect the strength of the composition by having pockets of clay concentrated, rather than uniformly dispersed, throughout the polymer. Affinity between clays and polymers is related to the fact that clays, by nature, are generally hydrophilic whereas polymers, such as the polymers used in the aforementioned applications, are generally hydrophobic.

Clay minerals are typically comprised of hydrated aluminum silicates that are fine-grained and have a platy habit. The crystalline structure of a typical clay mineral is a multi-layered structure comprised of combinations of layers of $SiO_4$ tetrahedra that are joined to layers of $AlO(OH)_2$ octahedra. The term "gallery", as used herein, describes the interlayer spaces of the layered clay minerals. The terms "d-spacing" or "basal spacing", as used herein, define the sum of the single layer thickness and the thickness of the interlayer or gallery, which is the repeat unit of the multi-layer mineral. Depending upon the clay mineral, the gallery may contain water and/or other constituents such as potassium, sodium, or calcium cations. Clay minerals vary based upon the combination of their constituent layers and cations. Isomorphic substitution of the cations of clay mineral, such as $Al^{3+}$ or $Fe^{3+}$ substituting for the $Si^{4+}$ ions in the tetrahedral network, or $Al^{3+}$, $Mg^{2+}$ or $Fe^{2+}$ substituting for other cations in the octahedral network, typically occurs and may impart a net negative charge on the clay structure. Naturally occurring elements within the gallery of the clay, such as water molecules or sodium or potassium cations, are attracted to the surface of the clay layers due to this net negative charge.

Nanocomposites are compositions in which at least one of its constituents has one or more dimensions, such as length, width or thickness, in the nanometer size range. The term "nanocomposite", as used herein, denotes the state of matter wherein polymer molecules exist among at least partially exfoliated clay layers. Recently, nanocomposites, that contain layered clay materials such as montmorillonite having silicate layers of a thickness of 1 nanometer dispersed within a polymeric matrix, have been developed as a means to improve the physical properties of polymers. In order to effectively improve the physical or mechanical properties, the clay is typically uniformly dispersed throughout the polymer in order to promote more interfaces between the clay and polymer and enhance the affinity of the clay to the polymer at these interfaces. Further, if the clay is uniformly dispersed throughout the polymer, less clay material may be added to the nanocomposite composition while maintaining the physical properties of the nanocomposite.

Polymer-clay nanocomposites can be characterized as being one of several general types: intercalated nanocomposite, exfoliated nanocomposite, or combinations thereof. The term "intercalated nanocomposite", as used herein, describes a nanocomposite that consists of a regular insertion of the polymer in between the clay layers. The term "exfoliated nanocomposite", as used herein, describes a nanocomposite wherein the 1 nm-thick layers of clay are dispersed in the matrix forming a composite structure on the microscale. The latter type of composite, or exfoliated nanocomposite, maximizes the polymer-clay interactions thereby making the entire surface of the clay layers available for the polymer. This modification may lead to the most dramatic changes in mechanical and physical properties of the resultant polymer. By contrast, the term "conventional composite", as used herein, describes a composite where the clay acts as a conventional filler and is not dispersed on a nano-scale. These composites generally do not enjoy the improvement in mechanical and physical properties seen with exfoliated nanocomposites. In certain embodiments of the present invention, some portion of the clay in the polymer clay nanocomposites may exist as structures larger than exfoliated or intercalated composites.

In order to promote more affinity between the clay and the polymer at the interface and provide a uniform dispersion of the clay within the polymer, the interlayer surface chemistry of the clay may be modified to render the silicate layers less hydrophilic. Previous methods of altering the interlayer surface chemistry of the clay include the use of modifying agents, such as surfactants or silanes, to prepare a clay dispersion prior to its incorporation into a polymer. For example, surfactants may typically comprise a molecule having a hydrophilic functions (which has an affinity to polar media such as water or clay) and an hydrophobic function (which has an affinity to organic molecules such as oil or polymer). The use of surfactants generally permits the dispersion of a clay within a polymer. As used herein, the term "hydrophobically modified clays" denotes clays that may have its surface chemistry modified through the use of an agent such as a surfactant, silane, or other modifier. As used herein, the term "unmodified clays" denotes clays that have not been hydrophobically modified by a modifying agent, or are used in their natural state.

Typical modifying agents used to render a clay less hydrophilic may include, but are not limited to, amino acids, alkylammonium ions, silanes, aminomethylstyrene, or living free radical polymerization initiator ("LFRP"). Further non-limiting examples of other suitable agents for the synthesis of nanocomposites are provided in the reference, M. Ogawa et al., "Preparation of inorganic-organic nanocomposites through intercalation of organoammonium ions into layered silicates", Bull. Chem. Soc. Jpn., 70, 2593-2619 (1997).

Amino acid surfactants are molecules that may consist of a basic amino group ($—NH_2$) and an acidic carboxyl group (—COOH). When introduced into an acidic medium, a proton may be transferred from the —COOH group to the intramolecular $—NH_2$ group. It is believed that a cation exchange occurs between the $—NH^{3+}$ functional group that is formed and the naturally occurring cations (i.e., $Na^+$, $K^+$, etc.) present between the clay layers. This results in an intercalated state wherein the $—NH^{3+}$ functional groups are "sandwiched" between the individual layers replacing the naturally occurring cation. The term "intercalate", as used herein, refers to incorporating foreign molecules, atoms, or ions in between the layers of the clay material. As a result of this intercalated state, the clay become hydrophobic. Amino acid surfactants are commonly used in the preparation of polyamide 6-clay hybrids because their acid functional group may polymerize with $\epsilon$-caprolactam that is intercalated between the layers. As a result, the intragallery polymerization delaminates the clay in the polymer matrix thereby forming a nanocomposite.

Alkylammonium ion surfactants, such as onium salts, are commonly used to prepare clay dispersions for nanocomposite materials. The basic formula for a typical alkylammonium ion is $CH_3—(CH_2)_n—NH^{3+}$ where n is from 1 to 18. It is believed that the alkylammonium ions also readily exchange with the naturally occurring cations present between the clay platelets resulting in an intercalated state. Further, it is believed that the alkylammonium ions may increase the d-spacing between the clay layers and also may lower the surface energy of the clay thereby allowing organic species with different polarities to become intercalated between the clay layers.

Silanes may also be used in the synthesis of unsaturated polyester-clay nanocomposites. Silanes are a family of organosilicon monomers, which may be characterized by the formula $R—SiX_3$, where R is an organofunctional group attached to silicon in a hydrolytically stable manner and X designates hydrolyzable groups that may be converted to silanol groups upon hydrolysis. It is believed that silanes interact with inorganic surfaces such as clay that have hydroxyl groups attached primarily to silicon or aluminum thereby forming a bond with the inorganic surface.

Hydrophobically modified clays have been oftentimes used in the preparation of nanocomposite materials. The article, "Synthesis and Characterization of Thermoset-Clay Nanocomposites" by Xavier Kornmann (referred to herein as the "Kornmann") provides some examples for synthesizing nanocomposites using hydrophobically modified clays using in-situ polymerization, melt intercalation, or solution-based polymerization methods. In the in-situ polymerization method, the hydrophobically modified clay, referred to in the article as "organoclay", is swollen in a monomer and then the polymerization reaction is initiated, through the addition of a curing agent or by an increase in temperature, to form the nanocomposite. It is believed that the polymerization reaction leads to the delamination of the clay. In the melt intercalation method, a molten thermoplastic is blended with a hydrophobically modified clay and then annealed at a temperature above the glass transition temperature of the polymer to form the nanocomposite. Lastly, in the solution polymerization method, the hydrophobically modified clay is first swollen in a solvent such as toluene or N,N-dimethylformamide. The polymer is then dissolved into the solvent where it intercalates between the clay layers. The solvent is then removed from the resulting nanocomposite via evaporation.

The article "Preparation and Characterization of PMMA-Clay Hybrid Composite by Emulsion Polymerization", *Journal of Applied Polymer Science,* Vol. 61 No. 7, Aug. 15, 1996, written by Dong Choo Lee and Lee Wook Jang (referred to herein as "Lee") discusses a batch emulsion polymerization method in which a methyl methyacrylate ("MMA") monomer is dispersed in a water phase and polymerized with a water soluble radical initiator in the presence of a sodium montmorillonite clay. The resultant polymer clay nanocomposite has a higher Tg along with an elevation in strength. We have suprisingly and unexpectedly found it is desirable to form polymer clay nanocomposites with a lower Tg that still exhibit an elevation in strength but not the expected rise in Tg as measured by as measured by differential scanning calorimetry ("DSC"). Lee does not disclose the polymerization of acid containing monomers which surprisingly and unexpectedly further enhances the affinity between the polymer and the clay within the nanocomposite resulting in improved physical properties. Lee also does not disclose the preparation of an emulsion polymer via a semi-batch or gradual addition method which allows, inter alia, better control of particle size, exotherm temperature, and percentage solids in comparison with batch emulsion polymerization methods. Further, Lee does not disclose core shell nanocomposite polymer compositions.

There are significant processing difficulties encountered when preparing nanocomposites in aqueous dispersions using hydrophobically modified clays. In this connection, U.S. Pat. No. 5,883,173 issued to Elspass et al. (hereafter "Elspass") describes a process for preparing single stage rubbery nanocomposite materials by polymerizing or blending latex polymers in the presence of a dispersion of a layered (clay) material. In the aqueous latex processes provided, Elspass discloses that the layered material is dispersed in water with a surfactant such as an onium salt for separating the layers, and then the monomers are polymerized for approximately 46 hours to allow the polymers to intercalate between the layers.

The step of adding a surfactant to exfoliate the layers is time-consuming (e.g., Elspass discloses mixing a clay, surfactant, and monomer slurry for 20 hours, prior to polymerizing for another 26 hours). Moreover, the exfoliated clay dispersions tend to be highly viscous thereby causing processing problems. The processes of the present invention do not require exfoliating the clay with an added surfactant and are accordingly much faster and lower in viscosity than those disclosed by Elspass.

The reference, Huang et al. "Synthesis and Characterization of PMMA Nanocomposites by Suspension and Emulsion Polymerization", *Amer. Chem. S.* (2000) ("Huang") describes the use of hydrophobically modified clays to form a PMMA nanocomposite via emulsion polymerization. During the emulsion polymerization, the surfactant was used as the emulsifier and the unmodified clay was added after polymerization. The Tg of the resultant nanocomposites are too high to be useful for many of the applications disclosed herein. Further, the nanocomposites are formed by a "melt press" process rather than in an aqueous system.

Another disadvantage of using hydrophobically modified clays is that the surfactants, particularly cationic surfactants, used to modify the clay may destabilize polymer latex emulsions. Many of the surfactants, such as onium salts, that are used to disperse clays are also emulsifying agents. In some cases, extreme difficulties may be encountered in the preparation of a stable polymer latex in the presence of such onium salt modified clays. To keep such emulsions stable in the presence of such onium salts, a large quantity of emulsifier is typically required. Larger quantities of emulsifier can degrade properties of the polymer in its final use (e.g., poorer water resistance). Furthermore, large quantities of emulsifier may deleteriously affect the formation of polymer latex particles. Non-uniform polymer latex particle formation may lead to variations in emulsion droplet size resulting in non-uniform polymer particle sizes. Large quantities of emulsifier may also lead to the formation of "secondary particles" which may further broaden the particle size distribution. As well, there are often problems associated with broad particle size distributions such as shear instability of the emulsion, variability in polymer molecular weight (leading to variations in polymer process and properties), and degradation of properties when dried to a powder (e.g., dust resulting from the presence of small polymer particles).

The foregoing problems aggravate the formation of latex polymer particles using emulsion polymerization processes. More particularly, the foregoing problems aggravate the formation of multi-stage latex polymer particles. Examples of multi-stage polymer processes, which are susceptible to these problems, include the preparation of "core-shell" polymer particles and using the gradual monomer addition, or "grad-add" processes.

The present invention does not require the use of modifying agents, such as surfactants, to create the exfoliated state. Thus, the present invention is directed to solving the aforementioned problems related to preparing aqueous nanocomposite dispersions with emulsion polymers using unmodified clays.

It is thus surprising and unexpected to prepare polymer clay nanocomposites incorporating unmodified clays in aqueous based systems such as emulsion polymerization. The methods of the present invention provide polymer clay nanocomposites that exhibit control of particle size, stability, and high polymerization rates. The methods of the present invention allow for control of reaction conditions such as temperature that is advantageous for industrial or commercial production. The methods of the present invention also allow for control of the viscosity of the resultant aqueous nanocomposite dispersions and thereby avoid processing problems associated with high viscosity. Further, the present invention provides methods for the formation of soft, film forming polymer clay nanocomposites that exhibit an increase in strength without the expected increase in Tg.

Nanocomposites produced in accordance with the methods of the present invention may preferably be provided in a form suitable for direct use in a variety of compositions, such as, for example, coatings, sealants, thermosets, textiles, textile binders, caulks, adhesives, and as plastics additives. The polymer clay nanocomposites of the present invention show significant property improvements at clay levels of 0.1-20%, such as increased tensile strength with little or no adverse effect on ancillary properties such as barrier properties, flexibility and the like. By contrast, conventional composites typically need 15-30% of a filler in order to see significant reinforcement. At this level of filler, ancillary properties like barrier properties, flexibility and the like are degraded.

The present invention is directed, in part, to nanocomposite compositions in aqueous systems and processes for preparing same. Specifically, in one embodiment of the present invention, there is provided a process for preparing an aqueous nanocomposite dispersion wherein a first and second aqueous reaction mixture is provided, combined, and then at least a portion of said ethylenically unsaturated monomers in the first and second aqueous reaction mixtures is polymerized. The first aqueous reaction mixture comprises at least one ethylenically unsaturated monomer, and the second aqueous reaction mixture comprises an at least partially exfoliated aqueous clay dispersion having at least one unmodified clay and at least one ethylenically unsaturated monomer. In certain embodiments, the monomer is polymerized after the combining step. It is understood, however, that these steps may be performed in a variety of different orders. For example, in one embodiment, the second providing step and the combining step may be performed either prior to or after the polymerizing step.

In another embodiment of the present invention, there is provided a process or preparing an aqueous nanocomposite dispersion which includes the steps of providing an emulsion which contains a plurality of polymer seeds having a mean particle diameter of 20 to 500 nanometers wherein the polymer seeds are present in the emulsion in an amount ranging from 0.1 to 10% based on dry weight of total dry polymer weight in the nanocomposite dispersion, providing a monomer mixture comprising at least one ethylenically unsaturated monomer, combining the monomer mixture and the aqueous emulsion and then adding an aqueous dispersion to the emulsion. This aqueous dispersion includes 0.1 to 20 weight percent based on dry weight of total dry polymer weight in the nanocomposite of a layered, unmodified clay. At least a portion of the monomer is polymerized thereby forming the polymer clay nanocomposite dispersion. It is understood, however, that these steps may be performed in a variety of different orders.

In still another embodiment of the present invention, there are provided coatings, adhesives, caulks, sealants, plastics additives, thermosets, textiles, textile binders, and thermoplastic resins prepared according to the processes of the present invention.

In a further embodiment of the present invention, there is provided a polymer clay nanocomposite powder prepared by drying the nanocomposite polymer particle dispersions prepared according to the processes of the present invention.

In still a further embodiment of the present invention, there is provided a core-shell nanocomposite polymer composition including a first stage core polymer, and a second stage nanocomposite shell. In this embodiment, the second stage nanocomposite shell includes at least 10 parts of an at least partially exfoliated unmodified clay and up to 90 parts of a polymer derived from at least one ethylenically unsaturated monomer unit.

In another embodiment of the present invention, there is provided a process for preparing an aqueous nanocomposite dispersion comprising the steps of providing an at least partially exfoliated unmodified aqueous clay dispersion wherein the dispersion comprises from 0.1 to 20% based on dry weight of said nanocomposite dispersion, adding at least one ethylenically unsaturated monomer to the clay dispersion wherein the monomer comprises from 80 to 99.9% based on dry weight of the nanocomposite dispersion, and polymerizing the monomer to form a polymer clay nanocomposite dispersion.

In yet a further embodiment of the present invention, there is provided a process for preparing an aqueous nanocomposite dispersion comprising admixing an aqueous emulsion polymer and at least 0.1% of a layered, unmodified clay.

These and other aspects of the invention will become apparent from the following detailed description.

The present invention is directed to processes for preparing nanocomposite compositions, particles, colloids, and dispersions using unmodified clays for emulsion polymerization systems. It has now been found that various emulsion polymerization procedures, such as multi-stage and grad-add polymerizations, are useful for preparing nanocomposite polymeric materials wherein a modifying agent, such as a surfactant, is not required to exfoliate the clay layers. The present invention overcomes the processing difficulties, such as particle size, viscosity, or other attributes, that are typically encountered using hydrophobically modified clays of the prior art. The present invention also provides uses for these aqueous based nanocomposite compositions, such as, for example, coatings, sealants, thermosets, textiles, textile binders, caulks, adhesives, and as plastics additives.

In certain embodiments of the present invention, the nanocomposite is prepared via an emulsion-based polymerization technique. For example, in connection with the preparation of an aqueous nanocomposite dispersion, two or more separate aqueous reaction mixtures may be prepared initially which is followed by a multi-stage emulsion polymerization of the monomer within one or all of the reaction mixtures. While the present application discusses multi-stage polymerization primarily in terms of two stages, it is understood that more than two stages of polymerization of the monomer is further envisioned. The term Astage@, Amulti-stage@, and "core shell" as used herein, is intended to encompass its broadest possible meaning, such as, for example, the meaning conveyed in U.S. Pat. Nos. 3,793,402, 3,971,835, 5,534,594, and 5,599,854, which disclose various means for achieving Astaged@ and Amulti-staged@ polymers. The first aqueous reaction mixture typically comprises a monomer mixture whereas the second aqueous reaction mixture comprises an aqueous clay dispersion and, optionally, a monomer mixture. In certain embodiments, however, the first aqueous reaction mixture may also comprise an aqueous clay dispersion. The term "aqueous nanocomposite dispersion" relates to a clay and polymer clay nanocomposite that further comprises an aqueous, or water phase. In certain embodiments, the monomer mixture in the first and or the second aqueous reaction mixtures may be emulsified. In one embodiment of the present invention, the percent weight of clay to the total amount of monomer within the aqueous nanocomposite dispersion can be in the range of from 0.05% to 20%, preferably from 0.1% to 15%, and more preferably from 0.1% to 10%, and even more preferably from 0.5% to 5%.

The aqueous nanocomposite dispersion contains polymerized units derived from at least one type of ethylenically unsaturated monomer. The term Aunits derived from@, as used herein, refers to polymer molecules that are synthesized according to known polymerization techniques wherein a polymer contains Aunits derived from@ its constituent monomers. Preferably, the ethylenically unsaturated monomer is selected such that the polymerized units within the aqueous nanocomposite dispersion are water insoluble, i.e., have low or no water solubility. By Awater-insoluble@ it is meant having a water solubility of no greater than 150 millimoles/liter at 25EC to 50EC.

The preparation of the monomer mixture typically involves the vigorous mixing of at least one ethylenically unsaturated monomer with water and an emulsifier. In other embodiments of the present invention the monomer may be added Aneat@, i.e., added without water. The amounts of monomer, water, and emulsifier in the monomer mixture may vary depending upon, for example, the particular monomer and/or emulsifier selected, the intended end-use, and the like. In certain embodiments, the amount of monomer in the monomer mixture is preferably in the range of from 25 to 100, preferably from 40 to 90, and even more preferably from 60 to 80 weight percent. The amount of water in the monomer mixture, if aqueous based, is preferably in the range of from 0.1 to 75, more preferably from 10 to 60, and even more preferably from 20 to 40 weight percent based on the total weight of the emulsified monomer mixture (e.g., monomers, emulsifier, and water). The amount of emulsifier in the monomer mixture, if added, is preferably in the range of from 0.01 to 10, preferably from 0.05 to 2, and even more preferably from 0.1 to 1 weight percent. If the emulsifier amount is too low then the monomer emulsion droplet size may be too large or cause an unstable emulsion. If the emulsifier amount is too high then excess emulsifier may interfere with the polymerization process.

The monomers which may be polymerized include any of the ethylenically unsaturated monomers commonly known in the art, such as those listed in The Polymer Handbook, $3^{rd}$ Edition, Brandrup and Immergut, Eds., Wiley Interscience, Chapter 2, (1989). Suitable ethylenically unsaturated monomers include, for example, the $C_1$-$C_{18}$ alkyl (meth)acrylate monomers (e.g., methyl-, ethyl-, propyl-, n-butyl-, sec-butyl-, tert-butyl, pentyl-, hexyl-, isobornyl- heptyl-, n-octyl-, 2-ethylhexyl-, decyl-, undecyl-, dodecyl-, lauryl, cetyl, and stearyl-(meth)acrylate and the like); vinyl aromatic monomers (e.g., styrene, alpha-methyl styrene, para-methyl styrene, chlorostyrene, vinyl toluene, dibromostyrene, tribromostyrene, vinyl naphthalene, isopropenyl naphthalene, divinylbenzene and the like); vinyl esters (e.g., vinyl acetate; vinyl versatate; and the like); vinyl-unsaturated carboxylic acids monomers (e.g., methacrylic acid, acrylic acid, maleic acid, itaconic acid); nitrogen-containing vinyl unsaturated monomers (e.g., acrylonitrile, methacrylonitrile, and $C_1$-$C_{18}$ alkyl (meth)acrylamides, and the like); dienes (e.g., butadiene and isoprene); ethylene, hydroxyethyl(meth)acrylate, hydroxypropyl(meth)acrylate, and the like. The term A(meth)acrylate@, as used herein, refers to both esters of methacrylate and acrylate.

For the purposes of preparing nanocomposite compositions having desirable resistance to weathering, it is preferred to use monomers selected from the class of alkyl (meth) acrylates. For the purposes of providing low cost and commercially available aqueous nanocomposite dispersions, it is preferable that the ethylenically unsaturated monomer be selected from the group consisting of $C_1$-$C_{18}$ alkyl methacrylate, $C_1$-$C_{18}$ alkyl acrylate, acrylic acid, methacrylic acid, butadiene, vinylaromatic monomers, and the like. For the purposes of using the aqueous nanocomposite dispersions for preparing coatings and adhesives, it is preferable to use $C_1$-$C_{18}$ alkyl (meth)acrylate monomers; acrylic acid; methacrylic acid; itaconic acid; vinyl acetate; vinyl versatate; vinyl aromatic monomers, and the like. It may be even more preferable to use n-butyl acrylate, ethyl acrylate, butyl methacrylate, methyl methacrylate, styrene, butadiene, acrylic acid, and methacrylic acid monomers for the purpose of providing aqueous nanocomposite dispersions in a variety of applications due to their relatively low cost and commercial availability.

Where it is desirable to covalently cross-link the polymers and/or to graft link multiple stage polymers (e.g., for preparing core-shell two-stage polymer particles), crosslinkers and/or graftlinkers may also be included in the monomer mixtures. The term Acrosslinker@, as used herein, refers to multi-functional monomers capable of forming two or more covalent bonds between polymer molecules of the same type. The term Agraftlinker@, as used herein, refers to multi-functional- monomers capable of forming two or more covalent bonds between polymer molecules of one type with polymer molecules of another type. Suitable crosslinkers or graftlinkers include, for example, divinyl benzene, butylene glycol dimethacrylate, alkanepolyol-polyacrylates or alkanepolyol-polymethacrylates such as ethylene glycol di(meth)acrylate, butylene glycol diacrylate, oligoethylene glycol diacrylate, oligoethylene glycol dimeth-acrylate, trimethylol-propane diacrylate, trimethylolpropane dimethacrylate, trimethylol-propane triacrylate (ATMPTA@) or trimethylolpropane trimethacrylate, and unsaturated carboxylic acid allyl esters such as allyl acrylate, diallyl maleate, and typically allyl methacrylate, and the like.

In certain preferred embodiments, at least one of the monomers within the monomer-containing mixture is a polar monomer. The term Apolar monomer@, as used herein, describes a monomer with a partially or completely negative charge. Examples of these monomers include, but are not limited to, monomers containing carboxylic acid, phosphate, or sulfate functional groups. Still further examples of polar monomers are monomers that include hydroxyl, ester, ether, amide, aldehyde and ketone functional groups. Preferably, the polar monomer is a carboxylic acid containing monomer. The term "acid containing monomer", as used herein, refers to any ethylenically unsaturated monomer that contains one or more acid functional groups or functional groups that are capable of forming an acid, such as an anhydride, for example, methacrylic anhydride, maleic anhydride, or itaconic anhydride. Examples of acid containing monomers include, for example, carboxylic acid bearing ethylenically unsaturated monomers such as acrylic acid, methacrylic acid, itaconic acid, maleic acid and fumaric acid; acryloxypropionic acid and (meth)acryloxypropionic acid; sulphonic acid-bearing monomers, such as styrene sulfonic acid, sodium vinyl sulfonate, sulfoethyl acrylate, sulfoethyl methacrylate, ethylmethacrylate-2-sulphonic acid, or 2-acrylamido-2-methylpropane sulphonic acid; phosphoethylmethacrylate; the corresponding salts of the acid containing monomer; or combinations thereof. In other embodiments of the present invention, the polar monomer comprises polar oligomers or unsaturated oligomers, such as trimers, that have a partially or completely negative charge and which have one or more points of unsaturation, such as terminal unsaturation. In certain other embodiments of the present invention, the polar monomer comprises low molecular weight polymeric stabilizers that may be soluble in base (i.e., contain many $CO_2H$ groups and are alkali soluble). Some non-limiting examples of these polar, polymeric stabilizers include MOREZ® 101 or TAMOL® 731, both of which are manufactured by Rohm and Haas, Inc. of Philadelphia, Pa. In these embodiments, the amount of polar stabilizer within the system may range from 15 to 50 weight percent.

In certain embodiments, the aqueous clay dispersion, or second reaction mixture, may comprise a monomer mixture of at least one ethylenically unsaturated monomer which is an anionic monomer. Preferably, the anionic monomer is an acid containing monomer. In these embodiments, a portion of the anionic monomer is Astaged@, i.e., a portion of the anionic monomer, 50% or less, preferably 25% or less, even more preferably 10% or less, is added to the first aqueous reaction mixture containing no clay and the remainder of the anionic monomer is added to the second aqueous reaction mixture. In embodiments involving acid-containing monomers, it is believed that this allows the acid functional groups to equilibrate within the clay galleries and remain there during the polymerization process. The acid containing monomer may aid in lowering the viscosity of the aqueous reaction mixture containing clay and enhance the affinity of the polymer to the clay surface. This staged method of anionic monomer addition may advantageously result in an improvement in physical properties in comparison to a straight addition of the anionic monomer to the first aqueous reaction mixture.

In embodiments where the acid-containing monomer is staged, the amount of acid staged in the second aqueous reaction mixture containing clay can range from greater than 0% to less than 100% of the total acid charged within the aqueous nanocomposite dispersion. The second aqueous reaction mixture may contain from 1% to 50%, preferably 5% to 25%, and even more preferably 5% to 15% of the acid containing monomer within the aqueous nanocomposite dispersion. For those embodiments which utilize higher levels of acid (i.e., 10% or greater of the total monomer within the aqueous nanocomposite dispersion is an acid containing monomer) or for those embodiments that use anionic surfactants for stabilization of the polymer dispersion, a lower percentage of acid containing monomer is incorporated into the second aqueous reaction mixture. The optimal amount of acid containing monomer will vary by the composition of the reaction mixture and the acid type. Accordingly, the optimal amount for enhancing the affinity between the polymer and the clay would include one clay acid group, one divalent ion, and one acid containing monomer. The optimal amount will employ only as much acid containing monomer as necessary in the second aqueous reaction mixture to modify the clay with polymer; the remaining amount of acid containing monomer within the first aqueous reaction mixture will then aid in stabilizing the growing polymer/clay nanocomposite particles.

In embodiments where nonionic polymer stabilizers are used, such as for example, alkyl ethoxylated surfactants, the relative amount of acid containing monomer within the second aqueous reaction mixture in comparison to the first aqueous reaction mixture will tend to be a higher percentage of the total amount of acid containing monomer in the nanocomposite. In these embodiments, the acid containing monomer is intended to specifically aid in the intercalation and exfoliation of the clay and not for stabilization of the polymer particle.

In certain embodiments, the reaction mixture may include a polymer latex or polymer latex particle. In these embodiments, the polymer latex may be prepared, or polymerized, from any of the aforementioned monomers. Preferably, the polymer latex or polymer latex particles are polymerized in an aqueous medium in the absence of the clay particles. In one embodiment, the polymer latex is prepared via emulsion polymerization employing a monomer mixture including at least one polymerizable acid containing monomer, wherein the acid containing monomer may be selected from the group consisting of itaconic acid and dihydrogen phosphate esters of an alcohol, the alcohol containing a polymerizable olefinic group, phosphoric acid, or methacrylic acid. Additional monomers used in the polymer latex or polymer latex particles of the present invention are provided in, for example, WO 93/12184 Vogel et. al.

Suitable emulsifiers may include, but are not limited to, those conventionally used in emulsion polymerization, such as salts of alkyl-, aryl-, aralkyl-, alkaryl- sulfates or sulfonates; alkyl-, aryl-, aralkyl-, alkaryl-poly(alkoxyalkyl) ethers; alkyl-, aryl-, aralkyl-, alkaryl-poly(alkoxyalkyl) sulfates; alkali salts of long-chain fatty acids such as potassium oleate, typically alkyl diphenyloxide disulfonate; and the like. The preferred emulsifiers may include, for example, dodecyl benzene sulfonate and dioctyl sulfosuccinate.

The second aqueous reaction mixture comprises an aqueous clay dispersion. The aqueous clay dispersions include at least 0.05, typically from 0.1 to 20, more typically from 0.1 to 15, even more typically from 0.1 to 10, and most typically from 0.5 to 5 weight percent of an unmodified clay based upon the weight of the monomer in the aqueous nanocomposite dispersion. The amount of water present in the aqueous clay dispersion is from 70 to almost 100 weight percent. In certain embodiments, the aqueous clay dispersion may also include a monomer mixture comprising at least one ethylenically unsaturated monomer, such as the monomers disclosed herein. In embodiments wherein a monomer mixture is added to the aqueous clay dispersion, the weight percentage of the monomer within the aqueous clay dispersion may be from 0.01% to 100% by weight.

In certain embodiments of the present invention, the weight percentage of the clay in the aqueous phase may decrease as it becomes incorporated into the nanocomposite/polymer phase of the aqueous nanocomposite dispersion. This decrease in clay concentration may occur during the polymerization step(s) as the polymers form and incorporate the clay (i.e., exfoliated clay layers and/or non-exfoliated clay particles) into the nanocomposite particles.

Suitable clays for the aqueous clay dispersion include any natural or synthetic layered mineral capable of being intercalated or exfoliated., Examples of such clays may include, for example, layered silicate minerals. The layered silicate minerals that may be employed include natural and synthetic minerals capable of forming intercalation compounds. Examples of some naturally occurring minerals include, but are not limited to those known as, smectite, phyllosilicate, montmorillonite, saponite, beidellite, montronite, hectorite, stevensite, vermiculite, kaolinite and hallosite. Preferably among these minerals is montmorillonite. Some non-limiting examples of synthetic minerals, or synthetic phyllosilicates, may include LAPONITE®, which is manufactured by Laporte Industries, Ltd. of Charlotte, N.C., magadiite, and fluorohectorite.

Clays typically have at least one naturally occurring cation, or first cation, such as potassium, calcium, or sodium, present within their galleries that are attracted to the net negative charge of the clay surface. For example, clays like montmorillonite may be mined with a naturally occurring or first cation such as sodium or calcium. The terms Asodium form@ or Acalcium form@ refer to clays that have an exchangeable cation which is sodium or calcium, respectively.

The cationic exchange capacity (ACEC@) of the clay relates to the ion exchange capacity of the clay, or the total quantity of positive charge that can be absorbed onto the clay surface, expressed in terms of positive charges per unit mass of colloidal particles. Some CEC values for exemplary clay materials are as follows: montmorillonite clays range from 70 to 150 meq/100 g; hallosite clays range from 40 to 50 meq/100 g; and kaolinite clays ranges from 1 to 10 meq/100 g. In certain embodiments of the present invention, the clays selected preferably have higher CEC values. In preferred form, clays used in the present invention may have a CEC capacity of about 40 meq/100 g or greater, preferably a CEC capacity of about 70 meq/100 g or greater, more preferably a CEC capacity of about 90 meq/100 g or greater, and even more preferably a CEC capacity of 100 meq/100 g or greater. In certain embodiments of the present invention, the CEC capacity of the clay may be increased, which enhances the affinity of the clay to the polymer within the nanocomposite dispersion, by electrochemically reducing the clay prior to the polymerization of at least a portion of the monomer.

Aqueous clay dispersions may be prepared by subjecting an aqueous clay mixture comprising at least one unmodified clay to shearing forces such as by mechanical mixing to partially and/or fully exfoliate the clay. Various high shearing methods to disrupt the physical integrity of clay particles in water to at least partially exfoliate the clay without requiring a modifying agent such as a surfactant are also envisioned. These methods include, but are not limited to, ultrasonication, megasonication, grinding/milling, high speed blending, homogenization, and the like. The aqueous clay dispersion may also be subjected to shearing forces at temperatures which range from 10 to 150° C., preferably from 20 to 100° C., and more preferably from 20 to 90° C. to further aid in exfoliating the clay layers. Although such high shearing methods may be used in the process of the present invention, these methods are not required to achieve an at least partially exfoliated state. In the various embodiments of this invention, the clay may include both exfoliated clay layers and non-exfoliated clay particles. In certain embodiments of the present invention, homogenization of the clay dispersion is not required.

In the present invention, the clays within the aqueous clay dispersion may be either partially or completely exfoliated. Preferably, the clay is an at least partially exfoliated clay. The term Aat least partially exfoliated clay@, as used herein, generally refers to clay in which the layers have been completely or partially separated from one another. By contrast, the term Anon-exfoliated clay@ generally refers to the physical state of clay which does not exist as separated layers. The term "intercalated" generally refers to the state where polymers are interposed between the layers of the clay within the system. The term "partially intercalated" generally refers to the state wherein some of the clay layers within the system have polymer in between the layers and other clay layers do not. Any of the various states of polymer and clay systems may be used in the present invention.

Typically, the aqueous dispersions of completely ("fully") exfoliated clay are quite viscous and/or gelatinous at clay concentrations greater than a few percent. It should be appreciated to those skilled in the art that the exact weight percent (concentration) of clay which forms such a highly viscous gel depends on a number of factors, including but not limited to clay type, temperature, pH, and the like. Typically, the clay dispersion forms a free-flowing liquid slurry rather than a viscous gel.

In the present invention, limiting the degree of exfoliation to less than 100% complete, i.e. partial exfoliation (less than 100%) typically provides clay dispersions that have reduced viscosities and/or a non-gelled liquid state. Hence, the portion of the clay that is exfoliated into clay layers typically provides the major contribution to viscosity increase while the non-exfoliated portion (i.e., clay particles) provides a minor contribution to the viscosity increase. Accordingly, the total amount of partially exfoliated clay in a aqueous clay dispersion is typically less than a few percent by weight, preferably 5% or less, more preferably 4% or less, and even more preferably 3% or less, based on the total weight of the dispersion. Further exfoliation of the clay may take place during subsequent processing, such as in the step of emulsion polymerization. It is contemplated that the reduction of viscosity of the aqueous clay dispersion may be aided by dispersants, such as, but not limited to polyphosphates. These may be added during the polymerization process or to the polymerized products.

Often, moderate mechanical mixing not requiring high shear may be suitable to provide dispersions of an at least partially exfoliated clay in water. When fully exfoliated clays cause processing problems associated with the presence of high viscosities and/or gels in the reaction media, the degree of exfoliation should be less than complete. Likewise, to achieve the desired chemical and physical properties, the clay should be at least partially exfoliated. As well, the step of shearing clays in an aqueous environment typically results in a viscosity increase of the aqueous environment. Usually, the greater the degree of exfoliation the greater the increase in viscosity.

Besides increasing the degree of exfoliation of the clay, increasing the clay concentration within the aqueous nanocomposite dispersion may also result in increased viscosities. To this end, viscosity may be controlled by dilution of the reaction media and/or clay dispersion by a suitable liquid, such as water. Typically, it may be desirable to control the viscosity of reaction media and/or clay dispersion by dilution prior to the polymerization step(s). For example, to obtain a high level of clay enrichment in the nanocomposites of the present invention (e.g., clay amounts greater than 5% based on total weight polymer within the aqueous nanocomposite dispersion), the reaction media may be diluted with a sufficient amount of water prior to subsequent polymerization steps to reduce the viscosity. The amount of dilution that is necessary to achieve a particular viscosity level may be readily determined by those skilled in the art. Typically, to obtain an appropriate viscosity range prior to adding subsequent reactants, the solids concentration of the reaction media may be controlled to less than 50%, typically from 10% to 40%, and even more typically from 20% to 30%. In certain embodiments, the viscosity of the aqueous dispersion prior to adding the reactants may range up to 5,000 centipoises (Acps@) using a Brookfield Viscometer and measured using a number 3 spindle at 60 revolutions per minute (Arpm@).

In the third step of one embodiment of the present invention, the first and second aqueous reaction mixtures, or aqueous mixture and aqueous clay dispersion, are multistage emulsion polymerized. Such multi-stage emulsion polymerization preferably involves the sequential polymerization of two or more monomer mixtures wherein the monomers of the first monomer mixture are polymerized to more than 80%, preferably more than 90%, and even more preferably more than 95% degree of conversion to form a polymer particle dispersion. This polymerization is preferably followed by the polymerization of a second monomer mixture containing the clay dispersion in the presence of the polymer particle dispersion to form additional polymers which may associate with the polymer particles (e.g., polymer shells around or domains within the polymer particles) and/or form additional polymer particles.

In another aspect of the present invention, an aqueous dispersion may be prepared by a multistage emulsion polymerization process, in which at least two stages that differ in composition are polymerized in sequential fashion. Such a process usually results in the formation of at least two mutually incompatible polymer compositions, thereby resulting in the formation of at least two phases within the polymer particles in the aqueous nancomposite dispersion. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases, the majority of the surface area of the particle will be occupied by at least one outer phase and the interior of the particle will be occupied by at least one inner phase. Each of the stages of the multi-staged emulsion polymers within the aqueous nancomposite dispersion may contain the same monomers, surfactants, redox initiation system, chain transfer agents, etc. as disclosed herein-above for the emulsion polymer. The polymerization techniques used to prepare such multistage emulsion polymers are well known in the art such as, for example, U.S. Pat. Nos. 4,325,856; 4,654,397; and 4,814,373.

During this step, it should be appreciated that the first and second aqueous reaction mixtures may be multi-stage polymerized in either order. For preparing nanocomposite compositions in the form of dry powders it is preferable that the monomer(s) within the clay-containing mixture, or second aqueous reaction mixture, is polymerized after the monomer(s) within the first aqueous reaction mixture.

In one embodiment of the present invention, the clay may be at least partially exfoliated during polymerization of the monomers in the second reaction mixture which contains the monomer and the unmodified clay. In this embodiment, the clay/monomer mixture may be the first stage of the multi-stage polymerization so that the inner polymer core portion of the multi-stage polymer will preferably contain at least a portion of the unmodified clay. In another embodiment, this clay/monomer mixture may be the second stage of the multi-stage polymerization so that the outer polymer shell portion of the multi-stage polymer will typically contain at least a portion of the unmodified clay. In further embodiments, both stages may contain the unmodified clay.

The emulsion polymerization step is typically carried out in a suitable reactor wherein the reactants (monomers, initiators, emulsifiers, unmodified aqueous clay dispersion, and optional chain transfer agents) are suitably combined, mixed, and reacted in an aqueous medium, and wherein heat may be transferred in to, and away from, the reactor. The reactants are typically added slowly (gradually, as in a semi-batch process) over time, continuously, or quickly as a "shot" (batchwise) into the reactor. Typically, the reactants are gradually added ("grad-add") to the reactor.

In other embodiments, the nanocomposite dispersions of the present invention may be polymerized through techniques other than emulsion polymerization. For example, the aqueous nanocomposite dispersions of the present invention may be polymerized via suspension polymerization or mini-emulsion polymerization.

In certain embodiments of the present invention, there is provided a process for preparing an aqueous nanocomposite dispersion, wherein the process comprises: polymerizing via suspension polymerization a suspension comprising at least one ethylenically unsaturated monomer and a unmodified clay to form the nanocomposite dispersion after polymerization, wherein the clay is dispersed in the water. The amount of monomer that is present in the suspension is from 30% to 99%, preferably from 45% to 99%, and more preferably from 60% to 98% by weight based upon the dry weight of ingredients within the suspension. Suspension polymerization, as used herein, generally involves dispersing a suspension of one more monomers in a liquid medium wherein the monomer is polymerized as droplets. The liquid medium is preferably water, however other media, such as perfluorocarbons, may also be used. The addition of one or more stabilizers to the suspension, along with mechanical agitation, aid in preventing agglomeration of the monomer droplets. Further non-limiting examples of suspension polymerization are provided in George Odian, *Principles of Polymerization,* 2nd ed. John Wiley and Sons, NY (1981), pp 287-288.

Dispersion polymerization, as used herein, is a variation of suspension polymerization. However, the initiators and dispersants used in dispersion polymerization may be water soluble whereas in suspension polymerization the dispersants may be water insoluble if the liquid medium is water. Some non-limiting examples of water insoluble, inorganic stabilizers or dispersants that may be used with certain embodiments of the present invention include, for example, hydroxyapatite, barium sulfate, kaolin, and magnesium silicates. Examples of water soluble stabilizers or dispersants may include, for example, organic polymers such as gelatin, methyl cellulose, poly(vinyl) alcohol), and alkali salts of poly(methacrylic acid), and optionally, in conjunction with inorganic electrolytes. Additional stabilizers or dispersants, that may be used in certain embodiments of the present invention, are provided, for example, in U.S. Pat. No. 4,582,859. Preferably, the stabilizers used within the suspension are dispersable or soluble within the liquid medium which may be water or another solvent. The amount of stabilizers or dispersants that may be added to the suspension is from 0.01% to 10%, preferably from 0.01% to 5%, and even more preferably from 0.01% to 2% by weight, based upon the dry weight of ingredients within the suspension. Optionally, a salt may be added, in quantities ranging from 0% to an unlimited amount, to the suspension to reduce the solubility of the monomer within the liquid medium. The initiators that may be added to the suspension varies depending upon the polymerization technique and liquid medium utilized. Depending upon the polymerization technique and the liquid medium used, the initiators may be water insoluble.

In certain embodiments of the present invention, there is provided a method for the preparation of polymer clay nanocomposite colloids wherein the method comprises: polymerizing via mini-emulsion polymerization a suspension comprising at least one ethylenically unsaturated monomer and an unmodified clay to form the nanocomposite colloid after polymerization, wherein the clay is dispersed in the water. In certain preferred embodiments of the present invention, there is provided a method for preparing a polymer clay nanocomposite colloid comprising: providing an aqueous clay mixture comprising at least one surfactant and an unmodified clay; providing at least one ethylenically unsaturated monomer, optionally at least one surfactant, and optionally at least one co-surfactant to provide a monomer emulsion; adding the monomer emulsion to the aqueous clay mixture under agitation conditions to provide a monomer clay aqueous dispersion; processing the monomer clay aqueous dispersion to provide a plurality of mini-emulsion droplets comprising the monomer and the clay; and polymerizing the monomer within the mini-emulsion droplets to form the polymer clay nanocomposite colloid.

The term "colloid" as used herein refers to composite particles having a number average particle size range from 0.05 to 1 μm. The term "mini-emulsion polymerization", as used herein, generally relates to methods involving stable submicron oil-in-water dispersions in which the monomer droplets within the dispersion may range in size from 0.05 to 1 μm. Further discussion of mini-emulsion polymerization techniques is provided in "Miniemulsion Polymerization" by E. D. Sudol et al., *Emulsion Polymerization and Emulsion Polymers,* John Wiley and Sons, NY (1997), pp. 700-722. The references, Erdem et al., "Encapsulation of Inorganic Particles via Miniemulsion Polymerization", *Proc. Am. Chem. Soc.* (Div Polym Mater Sci Eng) 1999, 80, 583 and Erdem et al., "Encapsulation of Inorganic Particles via Miniemulsion Polymerization. III. Characterization of Encapsulation", *Journal of Polymer Science: Part A: Polymer Chemistry,* Vol. 38, 4441-4450 (2000), provides some exemplary methods for mini-emulsion polymerization. The dispersion is typically obtained by shearing a system comprising oil, water, surfactant, and, optionally, a co-surfactant. Due to the small droplet size of the aqueous dispersion, it is believed that the monomer droplets within the miniemulsion may become the dominant site for particle nucleation.

Various initiator systems are known in the art of free radical initiation and may be used in the methods described herein. The selection of the initiator system may vary depending upon the polymerization technique used. A thermal initiator, such as, but not limited to, a persulfate salt may be used. Alternatively, a free radical redox initiator system may also be employed. Examples of such systems include, for example, an oxidizing agent or oxidant such as a persulphate, azo, peroxide (e.g., hydrogen peroxide, t-butyl hydroperoxide, t-amylhydroperoxide), and the like, in combination with a reducing agent or reductant such as sodium metabisulphite, sodium bisulfite, sodium sulfoxylate formaldehyde, sodium dithionite, isoascorbic acid, sodium hydrosulphite, 2-hydroxy-2-sulfinatoacetic acid, 2-hydroxysulfonatoacectic acid, and the like.

The free-radical initiators which are typically used in the various steps of the process are those conventionally utilized in free-radical redox polymerizations conducted in the temperature range from 10° C. to 100° C., preferably from 20° C. to 95° C., and more preferably from 55° C. and 90° C. Temperatures higher than 100° C. are possible using equipment that is designed for elevated pressures. In some embodiments involving redox initiation, initiation temperatures are preferably kept below 85° C., more preferably below 55° C. for redox initiation. In other embodiments involving thermal initiation with persulfate salts, temperatures in the range 80° C. to 90° C. are used.

In certain embodiments, the present invention may use a redox process to initiate the modification of the clay surface and to aid in the polymerization of the monomer between the layers of the clay. A relatively large percentage of the weight of clay, typically 2% by weight or greater, comprises redox-active multivalent metal ions such as iron, copper, manganese, and the like, that are present within the galleries and/or the surface layers of the clay. These redox-active multivalent metal ions, inherent within the clay or added to the system, may be used to accelerate radical generation from redox-active initiator components. In the redox process, a clay containing metal ions such as $Fe^{II}$ or $Fe^{III}$ may be reacted in the presence of either an oxidant or a reductant, respectively, to form radicals. Redox-derived radicals will be formed in the spaces between the clay layers or at the clay surface and foster intercalation and/or exfoliation of the clay. Further, redox processes may generate polymer clay nanocomposites that exhibit higher degrees of film clarity than without redox.

In the redox process wherein a clay with $Fe^{II}$ is reacted in the presence of an oxidant, a chemical reductant is added to an aqueous reaction mixture containing clay in its natural $Fe^{III}$ form and, optionally, a surfactant. Preferably, the amount of reductant added is in a sufficient quantity to reduce every mole of iron contained within the clay. Confirmation of the reduction of the clay from its $Fe^{III}$ to $Fe^{II}$ form may be made by observing a color change of the aqueous reaction mixture. The aqueous reaction mixture may become gray/green in appearance. Once the iron has been reduced, a chemical oxidant is added to the aqueous reaction mixture along with one or more monomers. The interaction of $Fe^{II}$ with the oxidants causes an electrochemical reaction which results in the transfer of electrons from the iron associated with the clay to the oxidant. Reduction of the oxidant causes the oxidant to split into an anion and a redox derived radical which can then initiate polymer chains either at the surface of the clay or in the gallery space between clay layers. In this manner, the redox initiation system can be helpful in the intercalation and/or exfoliation of a polymer/clay nanocomposite. This redox process may be used to initiate the polymerization and/or sustain the polymerization throughout the entire nanocomposite formation. In addition, the redox process may be used to alter the CEC value of the clay.

In an alternative embodiment, a $Fe^{III}$ form clay is reacted in the presence of a reductant and a monomer emulsion seed is added to an aqueous reaction mixture containing clay in its natural $Fe^{III}$ form. The reductant interacts with the $Fe^{III}$ groups of the clay and is oxidized which can cause radical formation and subsequent polymer chain initiation at or near the surface of the clay. Once the seed formation is complete, the nanocomposite latex is formed according to the standard methods disclosed herein. This redox process may also be used to initiate the polymerization and/or sustain the polymerization throughout the entire nanocomposite formation. In addition, the redox process may be used to alter the CEC value of the clay.

In certain embodiments wherein the redox system is the sole source of radicals, polymer chain growth may continue to be confined to regions near the clay surface to the extent that the iron is confined either to the clay plates or to the exchange spaces on the surface of the clay. The use of a reductant (such as sodium sulfoxylate formaldehyde, isoascorbic acid, and the like) and oxidant (such as ammonium persulfate, hydrogen peroxide, tert-butyl hydroperoxide, and the like) along with redox-active multivalent metal ions found in the clay or added separately is also a useful method for preparing the polymer/clay nanocomposites of the present invention.

In one embodiment of the present invention, the monomers may be added batch-wise (Ashot@) or fed continuously over time into the reactor. Continuous feeding by gradual addition of the aqueous reaction mixtures into the reactor over times from 0.5 to 18 hours, preferably from 1 to 12 hours, and even more preferably from 2 to 6 hours, is useful for controlling reaction temperature.

Optionally, at least one chain transfer agent may be incorporated during polymerization to control the molecular weight of the polymer. Examples of chain transfer agents include, but are not limited to, mercaptans, polymercaptans, and polyhalogen compounds. Further, non-limiting examples of chain transfer agents include alkyl mercaptans such as ethyl mercaptan, n-propyl mercaptan, n-butyl mercaptan, isobutyl mercaptan, t-butyl mercaptan, n-amyl mercaptan, isoamyl mercaptan, t-amyl mercaptan, n-hexyl mercaptan, cyclohexyl mercaptan, n-octyl mercaptan, n-decyl mercaptan, n-dodecyl mercaptan; mercapto carboxylic acids and their esters, such as methyl mercaptopropionate and 3-mercaptopropionic acid; alcohols such as isopropanol, isobutanol, lauryl alcohol and t-octyl alcohol; and halogenated compounds such as carbon tetrachloride, tetrachloroethylene, and tricholoro-bromoethane. Generally from 0 to 10% by weight, based on the weight of the monomer mixture, can be used. The polymer molecular weight may also be controlled by other techniques, such as selecting the ratio of initiator to monomer.

A stabilizing surfactant may be added to one or both of the reaction mixtures to discourage the aggregation of polymeric latex particles. In general, the growing latex particles are stabilized during emulsion polymerization by one or more surfactants such as an anionic or nonionic surfactant, or a mixture thereof. Examples of surfactants suitable for emulsion polymerization are provided in *McCutcheon's Detergents and Emulsifiers* (MC Publishing Co., Glen Rock, N. J.), published annually. Other stabilizing agents, such as protective colloids, may be used.

Buffers may also be present in the reaction mixture during an emulsion polymerization. Buffers are generally the salts of weak acids such as, but not limited to, sodium bicarbonate, sodium carbonate or sodium acetate. The amount of buffer that may be present, if added, in the reaction mixture may range from 0.01 to 5 weight percent based upon the total monomer used in the polymerization. Generally lower levels of a strong base, such as ammonia or sodium hydroxide, can also be used to control the pH of the polymerization. These agents may be added at any time either before, during, or after the polymerization step. Buffers may be further used to control hydrolysis of certain monomers, influence the extent of premature crosslinking during polymerization (as in the case when N-methylolacrylamide monomer is employed), influence the rate of decomposition of initiators, and/or affect the extent of dissociation of carboxylate acid monomers and surfactants to control colloidal stability.

The first mixture of monomers may be polymerized in the presence of a pre-formed polymer dispersion ("seed" latex), for controlling the desired particle size. Seeds are also typically used for controlling the structure and/or morphology of the resulting polymer. The "seed" latex may comprise small particles depending upon the desired use of the resulting emulsion polymer. In certain embodiments, the particles may have a mean diameter less than 200 nm, preferably less than 100 nm, and even more preferably less than 65 nm. In other embodiments, such as when larger emulsion polymer particle size is desired, the particles may have a mean diameter less than 250 nm, preferably less than 200 nm, and even more preferably less than 110 nm. Typical seed latex particles may have a composition similar to, or different than, the composition of the monomers used in preparing the first stage of the multistage nanocomposite or the first stage of a seeded single stage nanocomposite polymer. The pre-formed polymer dispersion may include polymer particles of a rubbery material, and may be similar or different in composition to the core polymer. The term Arubbery@, as used herein, denotes the thermodynamic state of a polymer above its glass transition temperature. Alternatively, the seeds may include hard non-rubbery polymer particles, (e.g., polystyrene or polymethyl methacrylate), which may be used for adjusting refractive index, as taught in Myers et al., U.S. Pat. No. 3,971,835.

In certain embodiments of the present invention, the first aqueous reaction mixture comprises an emulsion containing a plurality of polymer seeds which are present in the emulsion in an amount ranging from 0.1 to 20, preferably 0.1 to 15, and more preferably 0.1 to 10% based on dry weight of total dry polymer weight in the resulting nanocomposite dispersion. An aqueous dispersion, comprising at least 0.1 to 20% of a layered clay based on dry weight of total dry polymer weight in said nanocomposite, is added, preferably on a gradual basis, to the emulsion. A monomer mixture comprising at least one ethylenically unsaturated monomer is combined with the emulsion comprising the seeds either prior to or along with the aqueous dispersion. At least a portion of the monomer is then polymerized thereby forming the polymer clay nanocomposite dispersion. In certain embodiments, the polymer seeds of the aqueous emulsion are formed in the same reaction vessel in which the monomer is polymerized. In these embodiments, the aqueous clay dispersion may comprise up to 200 weight percent based on dry weight of a layered clay. The lower percentage solids within the reactor vessel allows one to add higher clay levels while maintaining a usable viscosity.

Another process of the present invention involves the gradual addition and polymerization of an aqueous dispersion containing at least one ethylenically unsaturated monomer and an unmodified, layered clay to one or more emulsion polymer seeds. In this process, the emulsion polymer seeds preferably have a particle diameter of 20 to 500 nm, more preferably 30 to 400 nm, and even more preferably 40 to 300 nm. The emulsion polymer seeds are from 0.1 to 10%, preferably 0.5% to 8%, even more preferably 1% to 5% based on dry weight of the total polymer weight in the nanocomposite dispersion. While polymer seeds may not typically contain clay, this embodiment further envisions that the polymer seeds may contain up to 20% clay, preferably up to 10% clay, and more preferably up to 5% of clay based on dry weight of the total polymer weight in said nanocomposite dispersion.

The aqueous dispersion in this process contains 80 to 99.95%, preferably 85 to 99.9%, and even more preferably from 90 to 99.9% based on dry weight of the total dry polymer weight in the nanocomposite dispersion of at least one ethylenically unsaturated monomer, and 0.05% to 20%, preferably from 0.1% to 15%, and even more preferably from 0.1% to 10%, based on dry weight of total dry polymer weight in said nanocomposite of a layered clay.

After polymerization of each stage it is desirable that at least 95%, preferably at least 97%, and even more preferably at least 99% based on weight of the monomer is polymerized in a reactor before a subsequent polymerization stage is begun.

The emulsion polymer seeds may be formed in the same reactor vessel where the monomers are polymerized and/or prepared in a separate reactor vessel and subsequently introduced to the reactor vessel where the monomers are polymerized. In a further embodiment, the polymer seeds may contain an at least partially exfoliated, unmodified layered clay. In this embodiment, the amount of clay is in the range of from 0.05% to 20%, preferably from 0.1% to 15%, and even more preferably from 0.1% to 10% based on dry weight of total dry polymer weight in the polymer seeds.

Another process of the present invention involves preparing an aqueous nanocomposite dispersion by admixing an aqueous emulsion polymer and 0.1 to 10% based on dry weight of said emulsion polymer, of a layered clay. In this process, the aqueous emulsion polymer is typically prepared according to any of the various known methods of preparing emulsion polymers according to the art of emulsion polymerization. In one embodiment of this process it is typical that the nanocomposite dispersions are prepared using gradual addition "grad-add" processes. In this embodiment it is also typical that the nanocomposite polymers are prepared by multi-stage polymerizations, such as core-shell polymer particles having a rubber core and a hard shell. In this embodiment, the amount of clay is in the range of from 0.05% to 20%, preferably from 0.1% to 15%, and even more preferably from 0.1% to 10% based on dry weight of total dry polymer weight in the polymer seeds.

The present invention also encompasses nanocomposite polymer particles that are formed in prior polymerization or additional polymerization stages. These stages may occur before, during, or after the formation of the stage containing the clay. Accordingly, the first stage core polymer particle may contain a rubbery polymer. Aqueous dispersions of nanocomposites containing rubbery polymers materials are useful in a number of applications, such as: plastics additive impact modifiers; thermoplastic resins having flexibility and/or good impact strength such as for capstock applications; thermoplastic elastomers; binders for coatings, caulks, sealants, and adhesives, and the like.

For preparing materials that have a rubbery component, it is desirable that the glass transition temperature of at least one constituent polymeric phase be less than the use temperature (e.g., ca. 25° C. for applications used at ambient conditions). The selection and amount of monomers required for controlling the glass transition may be readily determined through use of the Fox equation that is well known in the polymer art.

The polymers may also contain at least one additional polymer derived from at least one of any of the aforementioned ethylenically unsaturated copolymerizable monomers to form copolymers (e.g., random copolymers, block copolymers, graft copolymers, starpolymers, and various combinations thereof).

In one embodiment of the process of the present invention, the first aqueous reaction mixture may be polymerized to form a first stage emulsion polymer core particle having a particle diameter of 20 to 7000 nanometers, preferably 50 to 2000 nanometers, and even more preferably 50 to 800 nanometers. In this embodiment, the polymer is about 0.1 to 99% based on dry weight of the total dry polymer weight in the nanocomposite dispersion, and a second aqueous reaction mixture may be polymerized to form a second stage emulsion polymer shell around said core particle.

Larger core shell nanocomposites, e.g. 1,000 nanometers or greater, may be formed by polymerization techniques other than emulsion polymerization. These larger core shell nanocomposites may be formed via suspension polymerization as disclosed herein or via "swelling techniques" such as the techniques disclosed, for example, in "Aqueous Dispersions of Polymer-Oligomer Particles", *Polymer Colloids II,* Robert Fitch editor, Plenum Press, New York, N.Y., 1980, pp. 83-93. For example, a latex may be prepared by conventional emulsion polymerization techniques. After polymerization, the latex is then swollen with monomer and a chain transfer agent and the monomer is then polymerized to form an oligomer in an aqueous dispersion. The aqueous dispersion of the oligomer and an emulsifier is then swollen with monomer and polymerized to provide larger sized particles. Clay may be added at some point during the process to provide a large core shell nanocomposite. These larger core shell nanocomposites may be useful as-is or, for example, as cores in plastics additives.

In another embodiment of the present invention, a nanocomposite polymer composition having a core-shell morphology is provided containing a rubbery first stage polymer and a second stage nanocomposite shell. This nanocomposite polymer composition may contain from 1 to 99, preferably 30 to 70, more preferably 35 to 60, and even more preferably from 35 to 45 parts based on weight of a rubbery first stage core polymer, and from 99 to 1, preferably 70 to 30, more preferably from 40 to 65, and even more preferably from 55 to 65 parts based on weight of a second stage nanocomposite shell. The term "parts" used herein is intended to mean "parts based on weight".

In the core-shell nanocomposite polymer composition, the rubbery first stage core polymers contain from 45 to 99.9, preferably from 80 to 99.5, and even more preferably from 94 to 99.5 weight percent of units derived from at least one $C_1$-$C_8$ alkyl acrylate monomer. These polymers also contain from 0 to 35, preferably from 0 to 20, and even more preferably from 0 to 4.5 weight percent of units derived from at least one ethylenically unsaturated copolymerizable monomer different from the at least one $C_1$-$C_8$ alkyl acrylate monomer. These first stage core polymers further contain from 0.1 to 5, preferably from 0.1 to 2, and even more preferably from 0.5 to 1.5 weight percent based on weight of units derived from at least one crosslinker or graftlinker.

In the core-shell nanocomposite polymer composition, the second stage nanocomposite shell has a percent weight of unmodified clay to the total monomer and clay weight in the range of from 0.05% to 20%, preferably from 0.2% to 15%, and even more preferably from 0.5% to 10%, with the balance a polymer derived from at least one ethylenically unsaturated units selected from the group consisting of $C_1$-$C_{18}$ alkyl (meth)acrylate, acrylic acid, methacrylic acid, butadiene, and vinyl aromatic monomers. In this embodiment, the shell is typically hard; hard shells generally allow the nanocomposite polymer compositions to be provided in a dry powder form. Dry powder forms of nanocomposites containing relatively soft shells can be provided using various powder flow aids as is known in the art of powder preparation. Moreover, the shell may be hard or soft if the nanocomposite polymer is used in its aqueous dispersion form (e.g., coating, adhesives, caulks, sealants, and plastics additives).

The polymer clay nanocomposite powders of the present invention may also be isolated from the nanocomposite polymer particle dispersions in various ways. Some non-limiting examples of powder isolation methods include spray-drying or coagulation. Additional techniques to isolate the polymer clay nanocomposite particles include, for example, the techniques disclosed in U.S. Pat. No. 4,897,462. These techniques may also be applied to the emulsion during isolation to produce a spheroidal product which, when dried, exhibits outstanding powder flow, low dusting, and higher bulk density than conventionally isolated powders.

The polymer clay nanocomposite powders may further contain from 0 to 5 parts based on weight of a powder flow aid. Suitable powder flow aids may be incorporated in the spray drying process used for recovering dry powder capstock compositions. One non-limiting example of a powder flow aid is stearic acid-coated calcium carbonate. The reference, U.S. Pat. No. 4,278,576, also provides further examples of flow aids that may be useful for spray drying emulsions of polymer particles.

The process of the present invention is typically used for preparing nanocomposite resin powders having the requisite processing and physical characteristics of thermoplastic resin. As described above, dry powders of the nanocomposite polymers are typically prepared by recovering the particles either by spray drying or by coagulation followed by wet-cake drying. These nanocomposite polymers may be recovered separately as individual powders which are subsequently mixed together using a suitable powder mixing device (e.g., ribbon blender) to prepare a dry powder mixture which may be used as a thermoplastic resin. Alternatively, the separate unmodified aqueous clay dispersions and clay-free emulsion polymers may be blended in the emulsion state and subsequently recovered as a mixed dry powder blend by either co-spray drying or coagulation followed by drying.

Additional components in the nanocomposite resin composition, such as UV stabilizers, pigments, PVC resin, matting agents, flow aids, processing aids, lubricants, fillers, and the like, may be blended in either powder or liquid form with the nanocomposite resin powders. These components may be used, for example, in base resins for a capstock composition. Individual additives, such as, for example, a UV light stabilizer, may be emulsified, added to the nanocomposite resin particle dispersions, and co-spray-dried. Alternatively, emulsified additives, such as pigment dispersion may be added directly to nanocomposite resin powders in a suitable mixing device which allows for the addition of heat and the removal of water. Likewise, PVC wetcake may also be blended with powder or aqueous-based nanocomposite resin particle dispersions. Numerous combinations of mixing emulsion-based additives and powders followed by subsequent drying may be envisioned by one skilled in the art.

In another embodiment a pelletized form of the polymer clay nanocomposite composition is envisioned. Such pellets may be used, for example, in preparing thermoplastic film, sheet, and other various articles. In some circumstances, pellet-forms of the polymer clay nanocomposite may be more desirable than using a powder-form to avoid certain problems common to powders, such as dust formation. Accordingly, powders may be formed into pellets using any suitable plastics pelletization equipment or other methods known in the plastics processing art. These pellet forming steps may be combined with the mixing step wherein the components of the polymer clay nanocomposite resin composition may be compounded (mixed) and then pelletized using standard plastics processing equipment.

Another process of the present invention involves preparing an aqueous nanocomposite dispersion by admixing an aqueous emulsion polymer and 0.1 to 10% based on dry weight of said emulsion polymer, of a layered clay. In this process, the aqueous emulsion polymer is typically prepared according to any of the various known methods of preparing emulsion polymers according to the art of emulsion polymerization. In one embodiment of this process it is typical that the nanocomposite dispersions are prepared using gradual addition "grad-add" processes. In this embodiment it is also typical that the nanocomposite polymers are prepared by multi-stage polymerizations, such as core-shell polymer particles having a rubber core and a hard shell. In this embodiment, the amount of clay is in the range of from 0.05% to 20%, preferably from 0.1% to 15%, and even more preferably from 0.1% to 10% based on dry weight of total dry polymer weight in the polymer seeds.

The admixing step of the modified layered clay in this embodiment is preferably completed without the need for a clay modifying agent such as a surfactant. In another embodiment, the clay is predispersed in water and admixed with the aqueous emulsion polymer. Any mechanical mixing device may be suitable as long as the clay particles are at least partially exfoliated. More preferably, the clay particles are mixed to uniformly disperse the clay within the nanocomposite dispersion. For example, a COWLESJ mechanical mixer may be used to prepare aqueous clay dispersions containing up to 20% clay, however it is more preferable to use a mechanical homogenizer to prepare aqueous clay dispersions containing from 0.1 to 10% clay.

The aqueous nanocomposite clay-polymer dispersions of the present invention may also be prepared utilizing inverse emulsion polymerization. The processes described in, for example, U.S. Pat. Nos. 3,284,393, 3,826,771, 4,745,154, and accompanying references therein, can be utilized incorporating clay into the aqueous phase of these polymerizations when used to make an. acid containing polymer (high or low levels of acid). Other water soluble polymers modified by clay, such as polyacrylamide, may be prepared by this approach. Inverse emulsion polymerization methods may yield high molecular weight polymers or copolymers based on the water soluble monomers and mixtures comprised thereof. An aqueous solution of these monomers may be dispersed in an oil phase by means of a water in oil emulsifier and subsequently polymerized under free radical forming conditions.

The aqueous nanocomposite clay-polymer dispersions may be useful, for example, as coatings, sealants, caulks, adhesives, and as plastics additives. The coating compositions comprising aqueous nanocomposite clay-polymer dispersions may exhibit improved properties like block, print and dirt pick-up resistance, enhanced barrier properties, and enhanced flame retardence. Additionally, the coating compositions comprising the aqueous nanocomposites of the present invention may have the ability to utilize softer binders, without the need for additional coalescant (solvents) for film formation, and still maintain sufficient hardness, toughness and lower tack in a dried film. Suitable applications for the coating compositions of the present invention may include architectural coatings (particularly low VOC applications for semi-gloss and gloss); factory applied coatings (metal and wood, thermoplastic and thermosetting); maintenance coatings (e.g., over metal); automotive coatings; concrete roof tile coatings; elastomeric roof coatings; elastomeric wall coatings; external insulating finishing systems; and inks. It is further contemplated that the aqueous nanocomposite dispersions, when provided as an additive to a coating application, may impart hardness. A further application for the aqueous nanocomposite dispersion is for an opaque polymer and hollow sphere pigments. The inclusion of the aqueous nanocomposite dispersions may provide, for example, harder, more collapse resistant shells or may be suitable for the modification of fibers. Yet further non-limiting examples of applications for the aqueous clay-polymer clay nanocomposite dispersions: polish; binders (such as binders for nonwovens, paper coatings, pigment printing, or ink jet); adhesives (such as pressure sensitive adhesives, flocking adhesives, or other water based adhesives); plastics additives; ion exchange resins; hair fixatives; caulks; traffic paint; and sealants. The aqueous polymer clay nanocomposite dispersion may impart strength and toughness to the aforementioned applications.

In one embodiment of the present invention, the aqueous nanocomposite dispersions are capable of forming films upon drying (e.g., coatings and adhesives). In this embodiment, it is preferred that the polymers of the nanocomposites have a glass transition temperature in the range of from −80 EC to 50 EC. Glass transition temperatures may be calculated by using the Fox equation (see T. G. Fox, Bull. Am. Physics Soc., Vol. 1, Issue No. 3, page 123(1956)).

In another embodiment of this invention, caulking and sealant compositions containing an aqueous nanocomposite dispersion are provided. The various components, processes, and uses of the aforementioned coating compositions are preferably applicable to these nanocomposite-containing caulking and sealant compositions. In addition, caulking and sealant compositions preferably have a paste-like or gel-like consistency and preferably have higher viscosities than do coatings. Accordingly, caulks and sealants can be prepared using the aqueous nanocomposite dispersions of the present invention according to the general formulations known in the art of preparing caulks and sealants from emulsion polymers. In this embodiment, caulks and sealants can be prepared by blending fillers with the aqueous nanocomposite dispersions according to methods known in the art.

In some embodiments of this invention, the aqueous nanocomposite dispersions desirably form films upon drying, with or without the addition of plasticizers or coalescents (e.g., coatings and adhesives). In these embodiments, it is preferred that the polymers of the nanocomposites have glass transition temperatures in the range of from −80 EC to 10 EC.

In one embodiment of the present invention, a coating composition containing an aqueous nanocomposite dispersion is prepared. The coating composition of this invention may include, for example, coating or paint compositions which may be described in the art as architectural coatings, maintenance coatings, factory-applied coatings, automotive coatings, elastomeric wall or roof coatings, exterior insulating finishing system coatings, paper or paperboard coatings, overprint varnishes, fabric coatings and backcoatings, leather coatings, cementitious roof tile coatings, and traffic paints. Alternatively, the coating or paint compositions may be described as clear coatings, flat coatings, satin coatings, semi-gloss coatings, gloss coatings, primers, textured coatings, and the like. In these embodiments, it is preferred that the polymers of the nanocomposites have glass transition temperatures in the range from 0 EC to 70 EC.

The coating compositions of the present invention may further include pigments and/or fillers such as, for example, titanium dioxide, iron oxide, zinc oxide, magnesium silicate, calcium carbonate, organic and inorganic colored pigments, and clays other than layered clay. Such pigmented coating compositions typically contain from 3 to 70% pigment on a volume basis, or more preferably from 15 to 60% titanium dioxide on a volume basis. The coating composition may be prepared by techniques that are well known in the coatings art. First, optionally, at least one pigment is dispersed within an aqueous medium under high shear such as is afforded by a COWLES™ mixer or, alternatively at least one predispersed pigment may be used. Then, the aqueous nanocomposite dispersion may be added under low shear stirring along with other coatings adjuvants, as desired. Alternatively, the aqueous nanocomposite dispersion may be included in the optional pigment dispersion step. The coating composition may also contain conventional coatings adjuvants such as, for example, tackifiers, emulsifiers, coalescing agents, plasticizers, buffers, neutralizers, thickeners or rheology modifiers, humectants, crosslinking agents including heat-, moisture-, light-, and other chemical- or energy-curable agents, wetting agents, biocides, plasticizers, antifoaming agents, colorants, waxes, water repellants, slip or mar aids, anti-oxidants, and the like. The coating composition, in addition to the aqueous nanocomposite dispersion described herein, may also contain at least one additional polymer, preferably an additional emulsion polymer(s) selected from film-forming and non-film-forming emulsion polymers, including, but not limited to polymeric pigments, such as solid particles, particles having a single void, or multivoided particles. These additional polymers, if added to the coating composition of the present invention, may be present at a level of 0 to 200%, based on dry weight of the total dry polymer weight in the nanocomposite dispersion.

The solids content of the coating composition may be from 10% to 70% by volume. The viscosity of the coating composition may be from 0.05 to 100 Pascal-seconds (Pa.s), or 50 to 100,000 centipoise (cP), as measured using a Brookfield viscometer; the viscosities appropriate for different application methods vary considerably.

The coating composition may be applied by conventional application methods such as, but not limited to, brushing and spraying methods, roll coating, doctor-blade application, printing methods, air-atomized spray, air-assisted spray, airless spray, high volume low pressure spray, air-assisted airless spray, air knife coating, trailing blade coating, curtain coating, and extrusion.

The coating composition may be applied to a substrate such as, for example, paper or paperboard; consolidated wood products; glass; plastic; wood; metal; primed or previously painted surfaces; weathered surfaces; asphaltic substrates; ceramics; leather; and hydraulic substrates such as cement in 'green' or cured form, concrete, gypsum, and stucco. The coating composition applied to the substrate is typically dried, or allowed to dry, at a temperature from 10° C. to 95° C.

In another embodiment of this invention, an adhesive composition containing an aqueous nanocomposite dispersion is contemplated. The adhesive compositions may include, for example, those known in the art as pressure sensitive adhesives, laminating adhesives, packaging adhesives, hot melt adhesives, reactive adhesives, flocking adhesives, and flexible or rigid industrial adhesives. In these embodiments it is preferred that the polymers of the nanocomposites have glass transition temperatures in the range of from −80 EC to 80 EC. The adhesives are typically prepared by admixing optional pigment and the optional adjuvants listed herein above as coatings adjuvants. The adhesive compositions are typically applied to substrates including plastic substrates such as film, sheet, and reinforced plastic composites; metal foil; fabric; metal; glass; cementitious substrates; and wood or wood composites. Application to the substrates is typically effected on machine by transfer roll coater, e.g., or by manual application devices.

In another embodiment of this invention, a caulk or sealant composition containing an aqueous nanocomposite dispersion is contemplated. In these embodiments it is preferred that the polymers of the nanocomposites have glass transition temperatures in the range of from −80 EC to 0 EC. The caulk or sealant compositions are typically prepared by admixing pigment and such optional adjuvants listed hereinabove as coatings adjuvants as are appropriate. The caulk and sealant compositions are typically prepared at high solids content level such as 70 wt. % and above in order to minimize shrinkage on drying and consequently, may have a gel-like or paste-like consistency. Caulk and sealant compositions are typically applied to fill and/or seal junctions of substrates including metal; glass; cementitious substrates; wood or wood composites; and combinations thereof and are typically allowed to dry under ambient conditions.

In another embodiment of this invention, an ink composition containing an aqueous nanocomposite dispersion is contemplated. The ink compositions may include, for example, those known in the art as flexographic inks, gravure inks, ink jet inks, and pigment printing pastes. In these embodiments it is preferred that the polymers of the nanocomposites have glass transition temperatures in the range of from −50 EC to 50 EC. The inks are typically prepared by admixing optional pigment, predispersed pigment, or dyes and the optional adjuvants listed herein above as coatings adjuvants. The ink compositions are typically applied to substrates including plastic substrates such as film, sheet, and reinforced plastic composites; paper or paperboard; metal foil; fabric; metal; glass; cloth; and wood or wood composites. Application to the substrates is typically effected on machine by flexographic blankets, gravure rolls, and silk screens.

In another embodiment of this invention, a nonwoven fabric binder containing an aqueous nanocomposite dispersion is contemplated. The nonwoven binder compositions may include, for example, those known in the art as binders for consumer and industrial nonwovens such as wipes and interlining, binders for insulating nonwovens such as fiberfill and fiberglass, and binders/strengthening agents for nonwovens and paper such as oil filter paper. In these embodiments it is preferred that the polymers of the nanocomposites have glass transition temperatures in the range of from −60 EC to 50 EC. The nonwoven fabric binders are typically prepared by admixing optional pigment, and the optional adjuvants listed herein above as coatings adjuvants, as appropriate. The nonwoven fabric binder compositions are typically applied to substrates including nonwovens formed from cellulosic fibers such as paper and rayon; synthetic fibers such as polyester, aramid, and nylon; glass fibers and mixtures thereof. Application to the substrates is typically effected on machine by saturation bath, roll coater, spray, or the like.

In another embodiment of this invention, a polish containing an aqueous nanocomposite dispersion is contemplated. The polish compositions may include, for example, those known in the art as floor polishes, furniture polishes, and automobile polishes. In these embodiments it is preferred that the polymers of the nanocomposites have glass transition temperatures in the range of from 0 EC to 50 EC. The polishes are typically prepared by admixing optional pigment, and the optional adjuvants listed herein above as coatings adjuvants, as appropriate, particularly waxes. The polish compositions are typically applied to substrates including wood, vinyl or polynrethane flooring, ceramic tiles, painted metal, and the like. Application to the substrates is typically effected by spray, roller, mop, or the like.

In another embodiment of this invention, a plastics additive containing an aqueous nanocomposite dispersion is contemplated. The plastics additive compositions may include, for example, those known in the art as processing aids and impact modifiers. In these embodiments it is preferred that the polymers of the nanocomposites have glass transition temperatures in the range of from −50 EC to 50 EC. The plastics additives are typically prepared by admixing optional pigment, and the optional adjuvants listed herein above as coatings adjuvants, as appropriate, and, typically, drying the composition to a powdered form. The plastics additives compositions are typically mixed with the plastic such as, for example, polyvinyl chloride, polymethyl methacrylate and polypropylene, by milling or extrusion.

In a further aspect of the present invention, a digital imaging composition incorporating an aqueous nanocomposite dispersion and/or nanocomposite particles is contemplated. The term "digital imaging" as used herein generally relates to compositions that allow the reproduction of an image onto a substrate. Suitable applications for digital imaging compositions include toners for electrophotography such as xerography or compositions for ink jet printers or similar applications. The Tg and particle size for digital imaging compositions varies depending upon its method or system of use. Generally, digital imaging compositions for ink jet applications may have a lower particle size and Tg compared to the particle size and Tg for digital imaging compositions for electrophotography applications. For example, typical Tg values for ink jet applications may range from 45° C. to 60° C. whereas Tg values for electrophotography applications may range from 55° C. to 85° C. Further, non-limiting variables such as viscosity, surface tension, and pH of the digital imaging composition may also be adjusted based upon the end use of the composition.

In another aspect of the present invention, the emulsion polymer of the nanocomposite may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. In the case of a multi-staged polymer particle the Tg for the purpose of this invention is to be calculated by the Fox equation using the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373.

In other aspects of the present invention the emulsion polymer of the nanocomposite may be prepared by an emulsion polymerization process which is executed in such a manner to produce a bimodal or mutimodal particle size distribution as is taught in U.S. Pat. Nos. 4,247,438; 4,657,966; and 5,498,655, a bimodal or multimodal molecular weight distribution as is taught in U.S. Pat. Nos. 4,501,845 and 5,990,228, or non spherical particles such as, for example, rods as are taught in U.S. Pat. No. 5,369,163 and multilobal particles as are taught in U.S. Pat. No. 4,791,151.

In another aspect of the present invention the emulsion polymer of the nanocomposite may be prepared by a process which produces particles which when dry contain at least one void such as, for example, particles having a single void, multivoided particles, and particles having interpenetrating networks of void and polymer (polymer Asponge@).

In another aspect of the present invention the emulsion polymer of the nanocomposite may be prepared by a process which produces particles which may function in a manner instead of or in addition to providing binder functionality. Contemplated are emulsion polymers which function as pigment dispersants or thickeners/rheology modifiers such as alkali-soluble, acid-soluble, and hydrophobically-modified alkali-soluble or acid-soluble emulsion polymers.

EXAMPLES

TABLE I provides a summary of exemplary and reference compositions. The compositions in Table I vary with regard to whether the composition is single or multi-stage polymerized, the weight percentage of the unmodified clay added, and whether the clay is present by physically blending, referred to herein as "admixed", with an aqueous emulsion copolymer or present during polymerization, referred to herein as "in situ". Both the physical blending of the clay with the copolymer and the in situ polymerization of the acrylic monomers in the presence of the clay platelets is done in an aqueous emulsion media.

TABLES II through VI provide a comparison of the dielectric relaxation of thin polymer films, comprising exemplary polymer clay nanocomposites and reference compositions. These exemplary and reference compositions are cast upon identical aluminum substrate or test coupon to illustrate the differences in mechanical properties between the polymer clay nanocomposite and polymer reference compositions. Dielectric relaxation spectroscopy measurements were obtained using a Solartron Frequency Response Analyzer Model 1260, manufactured by Solartron Instruments, Inc., Allentown, Pennsylvania. The dielectric relaxation factor, also referred to herein as the dielectric storage factor, is related to the dynamic mechanical storage modulus of the composition.

TABLE II compares the dielectric relaxation measurements of a single stage copolymer comprising a 50:50 blend of methyl methacrylate ("MMA") and butyl acrylate ("BA") with two polymer clay nanocomposite compositions comprising 5% by weight of unmodified, sodium montmorillonite clay in the reaction mixture. The two polymer clay nanocomposite compositions differed in whether the clay was present in situ during polymerization or was admixed.

While there is generally an improvement in the mechanical properties of both polymer clay nanocomposite compositions in comparison to the reference composition without the clay, the increase in dielectric storage factor is more pronounced in the polymer clay nanocomposite compositions with the admixed clay. However, polymer clay nanocomposite compositions wherein the clay is admixed result in films that are not as clear relative to polymer clay nanocomposite compositions formed during polymerization.

TABLE III provides the dielectric relaxation spectra of an acrylic copolymer, p(BA/MMA=88:12) that is admixed with an aqueous emulsion copolymer with unmodified, sodium montmorillonite clay platelets. The spectra shows that the dielectric storage factor of the polymer nacomposite is greater than that of the reference copolymer. This increase in the dielectric storage factor may be attributable to an increase in the mechanical modulus of the copolymer due to the presence of the clay particles.

TABLE IV provides the dielectric relaxation spectra for the reference copolymer, p(BA/MAA=98:2) and two polymer clay nanocomposite compositions comprising the same copolymer physically blended with varying amounts of unmodified, sodium montmorillonite. TABLE IV shows that the dielectric storage factor similarly increases with increasing amounts of clay in the composition.

TABLE V provides the dielectric relaxation spectra for the reference copolymer, p(BA/MAA=50:50) and three polymer clay nanocomposite compositions comprising the same copolymer physically blended with varying amounts of unmodified, sodium montmorillonite. TABLE V also shows that the dielectric storage factor increases with increasing amounts of clay in the composition.

TABLE VI provides a comparison of the dielectric storage factor of a reference composition and two polymer clay nanocomposites derived from the in situ polymerization of polymers with core-shell morphology and an admixed blend with similar weight percentage of unmodified clay. For example, a core-shell polymeric-clay composite is prepared from a polymer that is composed of a core: 40% of crosslinked butylacrylate (BA/ALMA=99:1) and shell, 60% methyl methacrylate-butylacrylate copolymer (MMA/BA=95:5). The clay platelets, which are derived from sodium montmorillonite, are dispersed into the emulsified second stage (shell) monomer mixture prior to graft polymerization unto the rubber core of the core-shell polymer. The presence of exfoliated clay layers in the polymer shell was confirmed using X-ray diffraction (XRD) techniques.

Apparatus and General One-Stage Emulsion Polymerization Procedure

A stock solution of an at least partially exfoliated, unmodified 2.22% sodium montmorillonite (clay) was prepared by a homogenization process. Other unmodified clays from various commercial sources, such as "PGV" which is the trade name for a sodium montmorillonite clay sold by Nanocor, Arlington Heights, Ill. or "sodium cloisite" is the trade name for a sodium clay available from Southern Clay Products, Gonzales, Texas, may also be used. Partial exfoliation was achieved by observing an increase in viscosity of the stock solution during homogenization as well as observing the presence of non-exfoliated, intercalated clay particles in the resulting polymer-clay nanocomposites via XRD. A quantity of 10 g of clay was added to 440 g of deionized water to form an aqueous clay dispersion. The dispersion was homogenized for 2 minutes at 20,000 rpm using a Cyclone IQ$^2$ microprocessor controlled mechanical homogenizer using the smallest shaft. Because the clay dispersion remained clumpy, the homogenization process was repeated with a larger shaft for the same amount of time and at the same speed. This 2.22% clay dispersion was later used in the emulsion polymerization process.

The initial step in the emulsion polymerization process in the presence of the clay dispersion was to provide a reaction mixture. A monomer mixture, plus emulsifier, sodium lauryl sulfate (SLS) solution, and clay dispersion were homogenized for a maximum of two minutes at 20,000 rpm. The mixture comprised 30.6 weight percent of monomer, 68.83 weight percent of the 2.22 weight percent of the aqueous clay dispersion, and 0.58 weight percent of a 28 weight percent of SLS solution. This homogenized reaction mixture plus 33 g of deionized water rinse was then added to a 500-ml round bottom glass vessel fitted with stirrer, heating mantle, reflux condenser and nitrogen sweep. An initiator, consisting of 0.59 weight percent of sodium persulfate and 99.41 weight percent of deionized water, was added to the reaction mixture under room temperature conditions and stirring at 140 rpm. An additional 30 g of deionized water, was added to the reaction vessel. The entire mixture was heated to 60° C. and the reaction was allowed to exotherm. At the exotherm peak temperature, the reaction was held at 80° C. for one hour. The reaction mixture was cooled, filtered, and tested for total solids and particle size.

Reference Example 1

Single Stage 50 MMA /50 BA Copolymer, No Clay

The emulsion polymerization process described above was used to polymerize a monomer mixture comprising methyl methacrylate ("MMA") and butyl acrylate ("BA") in a 50:50 ratio. No clay dispersion was present. A portion of the emulsion was coated onto a 0.002 cm thick aluminum sheet to yield a 0.013 cm thick film. The entire arrangement of film and substrate, or laminate, was dried overnight in a vacuum oven at 75° C. After drying, a disk of 2.4439 cm$^2$ surface area was cut from the laminate and examined using dielectric relaxation spectroscopy. The results of this examination is provided in TABLE II.

Example 1

Single Stage, In-Situ Copolymerization of 50 MMA/50 BA with 5% Clay

A reaction mixture comprising a monomer mixture of MMA and BA in a 50:50 weight ratio of 50:50 and an aqueous clay dispersion was polymerized using the emulsion polymerization process described above to yield a nanocomposite dispersion containing 5% based on dry weight of clay. The final size of the polymer particles was 92 nm. The total solids content of the nanocomposite dispersion was 23.16 weight percent. A portion of the nanocomposite dispersion was coated onto a 0.002 cm thick aluminum sheet to yield a 0.015 cm thick film. The entire arrangement of film and substrate was dried overnight in a vacuum oven at 75° C. After drying, a disk of 2.4439 cm$^2$ surface area was cut from the laminate and evaluated by dielectric relaxation spectroscopy and the results are provided in TABLE II. As TABLE II illustrates, the dielectric storage factor for the composition in Example 1 is at least twice that of the Reference Example 1.

Example 2

50 MMA/50 BA Copolymer Dispersion Admixed with Clay to 5%

The emulsion prepared copolymer of Reference Example 1 was combined with an adequate quantity of an aqueous clay dispersion to yield a 5% nanocomposite dispersion based on dry weight of clay. The mixture was thoroughly homogenized by the process described in the general emulsion procedure. A portion of the homogeneous mixture was coated onto a 0.002 cm thick aluminum sheet to yield a 0.004 cm thick film. The entire arrangement of film and substrate was dried overnight in a vacuum oven at 75° C. After drying a disk of surface area 2.4439 $cm^2$ was cut from the laminate and evaluated, by dielectric relaxation spectroscopy, for improvement in the dielectric storage factor. The data provided in TABLE II reveals that the dielectric storage factor is slightly greater than that of Reference Example 1.

Reference Example 2

Single Stage Copolymerization of 88 MMA/12 BA with No Clay

An emulsion prepared copolymer of composition, p(MMA/BA=88:12) was coated onto a 0.002 cm thick aluminum sheet to yield a 0.005 cm thick film. The entire arrangement of film and substrate ("laminate") was dried overnight in a vacuum oven at 75° C. A disk of surface area 2.4439 $cm^2$ was cut from the laminate and evaluated, by dielectric relaxation spectroscopy, for improvement in the dielectric storage factor. TABLE III provides the dielectric storage factor for the reference composition.

Example 3

88 MMA/12 BA Copolymer Dispersion Admixed with Clay Dispersion to 5%

A portion of an emulsion prepared copolymer of composition p(MMA/BA=88:12) was combined with an adequate quantity of an aqueous clay dispersion to yield a nanocomposite dispersion containing 5% of unmodified clays, based upon the dry weight of clay within the mixture. The mixture was thoroughly homogenized by the process described in the general emulsion procedure. A portion of the homogeneous mixture was coated onto a 0.002 cm thick aluminum sheet to yield a 0.004 cm thick film. The entire arrangement of film and substrate was dried overnight in a vacuum oven at 75° C. After drying, a disk of surface area 2.4439 cm2 was cut from the laminate and evaluated, by dielectric relaxation spectroscopy, for improvement in the dielectric storage factor. The data listed in TABLE III reveal that the dielectric storage factor is slightly better than of the Reference Example 2 polymer.

Examples 4 to 6

98 MMA/2 BA Copolymer Dispersion Admixed with Clay to 0%, 2%, and 5%

An emulsion prepared copolymer of composition p(MMA/BA=98:2) was combined with a sufficient quantity of an aqueous clay dispersion to yield a 0%, 2% and 5% of total clay (Examples 4, 5, and 6, respectively), based on the overall weight of polymer clay mixtures. These mixtures were thoroughly homogenized by the process described in the general emulsion procedure. Portions of the neat polymer emulsion and the homogeneous mixtures were each coated onto a 0.002 cm thick aluminum sheet to yield: 0.015 cm, 0.021 cm and 0.034 cm thick films, respectively, for Examples 4,5, and 6. The entire arrangements of films and substrates were dried overnight in a vacuum oven at 75° C. After drying, disks of surface area 2.4439 $cm^2$ were cut from the laminates and evaluated, by dielectric relaxation spectroscopy, for improvement in the dielectric storage factor. The data listed in TABLE IV show that the dielectric storage factor generally increases as the amount of clay increases.

Examples 7 to 10

50 MMA/50 BA Copolymer Dispersion Admixed with Clay to 0%, 5%, 10% and 20%

Portions of an emulsion prepared copolymer of composition p(MMA/BA=50:50) are combined with adequate quantity of clay dispersion to yield: 0%, 5%, 10% and 20% of total clay (Examples, 7, 8, 9, and 10, respectively), based on the overall weight of polymer clay mixtures. These mixtures were thoroughly homogenized by the process described in the general emulsion procedure. Portions of-the neat polymer emulsion and the homogeneous mixtures were each coated onto a 0.002 cm thick aluminum sheet to yield: 0.013 cm, 0.004 cm and 0.007 cm and 0.006 cm thick films respectively. The entire arrangements of films and substrates were dried overnight in a vacuum oven at 75° C. After drying, disks of surface area 2.4439 $cm^2$ were cut from the laminates and evaluated, by dielectric relaxation spectroscopy, for improvement in the dielectric storage factor. The data listed in TABLE V reveal that the dielectric storage factor is generally increased with an increased amount of clay.

Apparatus and General Procedure for the Preparation of Two Stage Polymers

The two stage (core-shell) polymers that follow were prepared at a 5-L scale by a 40:60 core:shell gradual feed emulsion polymerization process starting with 40 nm diameter polymer seeds derived from 51 parts ethyl acrylate ("EA"), 49 parts MMA, and 1 part of MAA. The polymers with clay were prepared by first pre-emulsifying the monomer emulsion through simple manual agitation and then homogenizing the mixture with 10 g of clay for 2 minutes at 20,000 rpm in a Cyclone $IQ^2$ mechanical homogenizer.

Each of the two stage copolymer reactions was carried out by adding 99.96% of deionized water and 0.04% of acetic acid to a 5-L round bottom flask fitted with stirrer, heating mantle, reflux condenser, nitrogen sparge tube and feed tubes for both the monomer emulsion and the catalyst feeds. With the stirring set at 150 rpm, the mixture was sparged with nitrogen for one hour and heated to 50° C. The nitrogen sparge was changed to a sweep and an activator solution, consisting of 1.92% of sodium formaldehyde sulfoxylate (SSF) and 64.26% of deionized water, was added to the reaction vessel followed by 33.82% of deionized water rinse. A 61.6% polymer seed shot was then added with a 38.4% deionized water rinse. The temperature of the reaction mixture reached 50° C. before starting the gradual feed of the monomer emulsion and the catalyst.

The first stage monomer emulsion consisted of 81.1% of butyl acrylate (BA), 0.82% of allyl methacrylate (ALMA), 1.71% of a 23% solution of DS-4 or 1.71% of a 75% solution of dioctyl sulfosuccinate, and 16.37% of deionized water. The first stage catalyst feed consisted of 1.71% tert-butyl hydroperoxide (t-BHP) and 98.29% of deionized water. At the set temperature of 50° C., the heating was stopped and the reaction mixture was monitored to observe an exotherm. The monomer emulsion and catalyst feeds were started simultaneously. Both the monomer emulsion and catalyst solutions were set to feed for duration of 90 minutes. The monomer emulsion feed was fed at a rate of 9.63 g/min. and the t-BHP initiator feed was delivered at a rate of 0.4 g/min. At the end of 80 minutes of feeding the emulsified monomer mixture the remaining 126.9 g of emulsion was added to the reaction vessel. The monomer feed was followed by addition of 30 g deionized water, line rinse feed, into the reactor. At the end of the initiator feed, 15 g of deionized water, line rinse feed, was fed into the reactor. After all the line rinses were added, the first stage latex was sampled for particle size and polymer conversion.

For the second stage of the polymerization, the first stage reaction mixture was stirred at 170 rpm. The stage 2 activator solution, consisting of 2.62% SSF, 86.91% of deionized water and a 10.47% deionized water rinse was added to the reaction. At this time a 120 minute monomer emulsion and initiator, t-BHP feeds were started. The monomer emulsion for the in situ polymerization with clay consisted of 69.74% of MMA, 3.67% of BA, 24.47% of deionized water, 1.28% of a 23% solution of DS-4 or 1.71% of a 75% solution of dioctyl sulfosuccinate, 0.15% of n-dodecyl mercaptan (n-DDM), and 0.7% of clay. The monomer emulsion for the examples without clay consisted of 70.23% of MMA, 3.70% of BA, 24.64% of deionized water, 1.29% of a 23% solution of DS-4, 0.15% of n-DDM and 0% of clay. The catalyst solution was made up of 11.1% of t-BHP and 88.9% of deionized water. The monomer emulsion was fed at a rate of 11.9 g/min. and the initiator was fed at a rate of 0.562 g/min. During the course of the reaction, heat was applied to the reaction vessel if the reaction temperature fell below 65° C. At the end of the feeds, rinse feeds of 30 g of deionized water, for the monomer emulsion and 15 g of deionized water were added. The reaction mixture was held at its peak temperature for 30 minutes before being cooled and filtered.

Reference Example 3

Multi-Stage Copolymerization of 40 (99 BA/1 ALMA)//60 (95 MMA/5 BA), with DOSS Emulsifier, but with No Clay Using the emulsion polymerization process described above for the two stage copolymer, a two stage copolymer composed of methyl methacrylate: butyl acrylate ratio of 60:40 was synthesized to yield a polymer latex with 204 nm average particles (no clay). The emulsifier used in the polymerization process was 1.28% of a 75% solution of dioctyl sulfosuccinate sodium salt. The total solids content of the emulsion was 48.55 weight percent. A portion of the emulsion was coated onto a 0.002 cm thick aluminum sheet to yield a 0.069 cm thick film. The entire arrangement of film and substrate was dried overnight in a vacuum oven at 75° C. After drying a disk of surface area 2.7318 $cm^2$ was cut from the laminate and evaluated, by dielectric relaxation spectroscopy., for assessment of the magnitude of the dielectric storage factor. The data listed in TABLE VI, reveal the value of the dielectric storage factor. A list of the mechanical properties are given in TABLE VII.

Example 11

Multi-Stage Copolymerization of 40 (99 BA/1 ALMA)//60 (95 MMA/5 BA) with DOSS Emulsifier, and with 0.7% Clay in Second Stage The emulsion polymerization process described in Reference Example 3 for the two stage copolymer was employed in the preparation of a two stage copolymer that composed of MMA: BA ratio of 60:40. The copolymer was synthesized in the presence of 0.7 weight percent of clay to yield a polymer latex with 204 nm average particles. The emulsifier used in the polymerization process was a 1.28% of a 75% solution of dioctyl sulfosuccinate sodium salt (DOSS). The total solids content of the emulsion was 48.55 weight percent. A portion of the emulsion was coated onto a 0.002 cm thick aluminum sheet to yield a 0.047 cm thick film. The entire arrangement of film and substrate was dried overnight in a vacuum oven at 75° C. After drying a disk of surface area 1.4935 $cm^2$ was cut from the laminate and evaluated, by dielectric relaxation spectroscopy, for assessment of the magnitude of the dielectric storage factor. The data listed in TABLE VI reveal that the dielectric storage factor is at least twice the size of that for the polymer defined in the reference example 3. The mechanical properties listed in TABLE VII supports the improvement in dielectric storage factor.

Reference Example 4

Multi-Stage Copolymerization of 40 (99 BA/1 ALMA)//60 (95 MMA/5 BA), with DDBS Emulsifier, but with No Clay The emulsion polymerization process described above for the two stage copolymer was employed in the preparation of a two stage copolymer that composed of MMA: BA ratio of 60:40. The copolymer was synthesized in the presence of no clay to yield a polymer latex with 204 nm average particles. The emulsifier used in the polymerization process was a 1.28% of a 75% solution of dodecyl benzene sulfonate (DDBS). The total solids content of the emulsion was 48.55 weight percent. The mechanical properties are listed in TABLE VII.

Example 12

Multi-Stage Copolymerization of 40 (99 BA/1 ALMA)//60 (95 MMA/5 BA) with DDBS Emulsifier, and with 0.7% Clay in Second Stage A multi-stage nanocomposite dispersion was prepared according to Example 11 with the exception that DDBS was used as the emulsion instead of DOSS. The mechanical properties listed in TABLE VII, shows that using DDBS provides enhanced Dynatup Impact strength over using DOSS in multi-stage nanocomposite dispersions.

Example 13

40 (99 BA/1 ALMA)//60 (95 MMA/5 BA) Core-Shell Copolymer Dispersion Admixed with Clay to 0.6%

In this example, the emulsion polymerization process described above for the two stage copolymer was used in the preparation of a two stage copolymer that composed of MMA: BA in a 60:40 ratio. The copolymer was synthesized in the presence of no clay to yield a polymer latex with 204 nm average particles. The emulsifier used in the polymerization process is a 1.28% of a 75% solution of dodecyl benzene sulfonate. The total solids content of the emulsion was 48.56 weight percent. A portion of the emulsion was combined with a homogeneous aqueous clay dispersion to yield a 0.6% of polymer clay mixture. The mixture was thoroughly homogenized by the process described in the general emulsion procedure. A portion of the emulsion was coated onto a 0.002 cm thick aluminum sheet to yield a 0.104 cm thick film. The entire arrangement of film and substrate was dried overnight in a vacuum oven at 75° C. After drying a disk of surface area 2.4885 $cm^2$ was cut from the laminate and evaluated, by dielectric relaxation spectroscopy, for assessment of the magnitude of the dielectric storage factor. The data listed in TABLE VI reveal that the dielectric storage factor is at least twice that for the polymer defined in the reference example 3. The mechanical properties listed in TABLE VII, falling dart impact energy, is consistent with the relatively low dielectric storage factor.

TABLE I

Composition Summary

| Ex. | Stage I Polymer | Stage II Polymer | % wt Clay | Clay Addition |
|---|---|---|---|---|
| Ref. 1 | p(MMA/BA) = 50:50) | — | 0.0 | — |
| Ref. 2 | p(MMA/BA = 88:12) | — | 0.0 | — |
| 1 | p(MMA/BA) = 50:50) | — | 5.0 | in-situ |
| 2 | p(MMA/BA) = 50:50) | — | 5.0 | admixed |
| 3 | p(MMA/BA = 88:12) | — | 5.0 | admixed |
| 4 | p(MMA/BA = 98:2) | — | 0.0 | — |
| 5 | p(MMA/BA = 98:2) | — | 2.0 | admixed |
| 6 | p(MMA/BA = 98:2) | — | 5.0 | admixed |
| 7 | p(MMA/BA = 50:50) | — | 0.0 | admixed |
| 8 | p(MMA/BA = 50:50) | — | 5.0 | admixed |
| 9 | p(MMA/BA = 50:50) | — | 10.0 | admixed |
| 10 | p(MMA/BA = 50:50) | — | 20.0 | admixed |
| Ref. 3 | 40 parts p(BA-ALMA = 99:1) | 60 parts p(MMA/BA = 95:5) | 0.0 | — |
| 11 | 40 parts p(BA-ALMA = 99:1) | 60 parts p(MMA/BA = 95:5) | 0.7 | in-situ Stage II |
| Ref. 4 | 40 parts p(BA-ALMA = 99:1) | 60 parts p(MMA/BA = 95:5) | 0.0 | — |
| 12 | 40 parts p(BA-ALMA = 99:1) | 60 parts p(MMA/BA = 95:5) | 0.7 | in-situ Stage II |
| 13 | 40 parts p(BA-ALMA = 99:1) | 60 parts p(MMA/BA = 95:5) | 0.6 | admixed |

TABLE II

Dielectric Relaxation of Single Stage Copolymer and Composites in the p(MMA/BA = 50:50) + Clay System

| FREQUENCY (Hz) | E' Reference Example 1 (No Clay) | Example 1 (5% in-situ clay) | Example 2 (5% admixed clay) |
|---|---|---|---|
| 1.00E+06 | 2.58E−13 | 6.29E−13 | 8.93E−13 |
| 3.16E+05 | 5.38E−13 | 7.54E−13 | 1.25E−12 |
| 1.00E+05 | 6.86E−13 | 8.29E−13 | 1.44E−12 |
| 3.16E+04 | 7.10E−13 | 8.87E−13 | 1.50E−12 |
| 1.00E+04 | 7.18E−13 | 9.62E−13 | 1.56E−12 |
| 3.16E+03 | 7.56E−13 | 1.06E−12 | 1.66E−12 |
| 1.00E+03 | 6.80E−13 | 1.18E−12 | 1.75E−12 |

TABLE III

Dielectric Relaxation of Single Stage Copolymer and Composites in the p(MMA/BA = 88:12) + Clay System

| Frequency (Hz) | E' Reference Example 2 (No Clay) | Example 3 (5% admixed clay) |
|---|---|---|
| 1.00E+06 | 5.90E−13 | 5.79E−13 |
| 3.16E+05 | 7.07E−13 | 9.35E−13 |
| 1.00E+05 | 7.61E−13 | 1.14E−12 |
| 3.16E+04 | 7.72E−13 | 1.24E−12 |
| 1.00E+04 | 7.73E−13 | 1.36E−12 |
| 3.16E+03 | 7.82E−13 | 1.55E−12 |
| 1.00E+03 | 7.65E−13 | 1.78E−12 |

TABLE IV

Dielectric Relaxation of Single Stage Copolymer and Composites in the p(MMA/BA = 98:2) + Admixed Clay System

| Frequency (Hz) | E' Reference Example 4 0% Clay | Example 5 2% Clay | Example 6 5% Clay |
|---|---|---|---|
| 1.00E+06 | 4.80E−13 | 5.32E−13 | 1.52E−12 |
| 3.16E+05 | 8.21E−13 | 1.02E−12 | 2.55E−12 |
| 1.00E+05 | 1.00E−12 | 1.28E−12 | 3.16E−12 |
| 3.16E+04 | 1.02E−12 | 1.33E−12 | 3.47E−12 |
| 1.00E+04 | 1.04E−12 | 1.35E−12 | 3.86E−12 |
| 3.16E+03 | 1.06E−12 | 1.38E−12 | 4.42E−12 |
| 1.00E+03 | 1.08E−12 | 1.42E−12 | 5.22E−12 |

TABLE V

Dielectric Relaxation of Single Stage Copolymer and Composites in the p(MMA/BA = 50:50) + Admixed Clay System

| Frequency (Hz) | E' Reference Example 7 0% Clay | Example 8 5% Clay | Example 9 10% Clay | Example 10 20% Clay |
|---|---|---|---|---|
| 1.00E+06 | 2.58E−13 | 6.29E−13 | 8.28E−13 | 1.47E−12 |
| 3.16E+05 | 5.38E−13 | 7.54E−13 | 1.08E−12 | 1.76E−12 |
| 1.00E+05 | 6.86E−13 | 8.29E−13 | 1.25E−12 | 1.92E−12 |
| 3.16E+04 | 7.10E−13 | 8.87E−13 | 1.39E−12 | 2.03E−12 |
| 1.00E+04 | 7.18E−13 | 9.62E−13 | 1.60E−12 | 2.16E−12 |
| 3.16E+03 | 7.56E−13 | 1.06E−12 | 1.88E−12 | 2.28E−12 |
| 1.00E+03 | 6.80E−13 | 1.18E−12 | 2.36E−12 | 2.35E−12 |

TABLE VI

Dielectric Relaxation of Multi-Stage Copolymer and Composites in the 40 (99 BA/1 ALMA)//60 (95 MMA/5 BA) + Clay System

| Frequency (Hz) | E' Reference Example 3 (No Clay) | Example 11 (0.7% in-situ clay) | Example 13 (0.6% admixed clay) |
|---|---|---|---|
| 1.00E+06 | 3.26E−13 | 9.40E−13 | 3.84E−13 |
| 3.16E+05 | 4.84E−13 | 1.14E−12 | 6.46E−13 |
| 1.00E+05 | 4.73E−13 | 1.12E−12 | 6.27E−13 |
| 3.16E+04 | 4.62E−13 | 1.11E−12 | 6.26E−13 |
| 1.00E+04 | 4.69E−13 | 1.10E−12 | 6.44E−13 |

TABLE VII

Mechanical Test Results of Multi-Stage Nanocomposite Materials

| EXAMPLE | REF. EX-3 | | EXAMPLE 11 | | REFERENCE EXAMPLE 4 | | EXAMPLE 12 | | EXAMPLE 13 | |
|---|---|---|---|---|---|---|---|---|---|---|
| (note 1) | Value | StdDev | Value | StdDev | Value | StdDev | Value | StdDev | Value | StdDev |
| Dynatup Impact (D3763), ⅛" plaques, n = 5 | | | | | | | | | | |
| Total Energy (ft-lb) | 8.7 | 1.5 | 9.3 | 2.5 | 8.1 | 1.4 | 11.7 | 1.2 | 5.4 | 0.7 |
| % Ductile | 0 | | 0 | | 20 | | 0 | | 0 | |
| Notched Izod (D256), n = 5 | | | | | | | | | | |
| ⅛" Izod (ft-lb/in) | 1.41 | 0.11 | 1.48 | 0.06 | 1.45 | 0.19 | 1.48 | 0.02 | 1.18 | 0.03 |
| % Hinged | 0 | | 0 | | 0 | | 0 | | 0 | |
| ¼" Izod (ft-lb/in) | 0.75 | 0.07 | 0.89 | 0.06 | 0.89 | 0.11 | 0.89 | 0.09 | 0.51 | 0.03 |
| % Hinged | 0 | | 0 | | 0 | | 0 | | 0 | |
| Tensile Impact (D1822), n = 5 | | | | | | | | | | |
| Strength (ft-lb) | 99.3 | 9.5 | 131.7 | 33.8 | 89.7 | 19.7 | 99.6 | 21.3 | 84.6 | 14.9 |
| Tensile Properties (D638) Type 5, n = 5 | | | | | | | | | | |
| Yield (%) | 5.4 | 0.1 | 5.3 | 0.1 | 5.9 | 0.7 | 5.7 | 0.1 | 5.8 | 0.2 |
| (psi) | 4198 | 33 | 3924 | 30 | 4358 | 172 | 4578 | 44 | 4658 | 31 |
| Max (%) | 79.1 | 7.4 | 85.2 | 13.3 | 101.3 | 6.2 | 69.3 | 6.9 | 95.0 | 8.1 |
| (psi) | 4655 | 224 | 4530 | 319 | 5174 | 144 | 5190 | 211 | 5202 | 261 |
| Break (%) | 79.5 | 6.7 | 85.4 | 12.8 | 101.3 | 6.2 | 69.5 | 6.6 | 95.1 | 8.0 |
| (psi) | 4648 | 236 | 4526 | 327 | 5174 | 144 | 5184 | 223 | 5198 | 265 |
| Tan Modulus (psi) | 185,425 | 1,276 | 173,800 | 1,751 | 187,140 | 11,408 | 204,600 | 3,130 | 195,920 | 5,116 |
| Flexural Properties (D790), n = 5 | | | | | | | | | | |
| Modulus (psi) | 160,013 | 3,048 | 145,742 | 2,404 | 166,618 | 468 | 162,684 | 1,058 | 178,726 | 1,101 |
| DTUFL (D648), @264 psi, As Received, n = 2 | | | | | | | | | | |
| DTUFL (° C.) | 59.8 | 1.8 | 58.1 | 0.8 | 62.3 | 1.6 | 61.6 | 1.3 | 64.8 | 1.5 |
| Rockwell Hardness (D785), 'R' Scale, n = 3 | | | | | | | | | | |
| Rockwell ('R') | 49.6 | 1.0 | 34.9 | 4.3 | 63.9 | 1.7 | 53.7 | 1.5 | 68.2 | 1.7 |

Note 1:
Emulsions were oven dried to powders, pelletized and injection molded into plaques.

Reference Example 14

A latex was synthesized via the following method: To an empty reactor kettle was added 436.00 g DI water, 5.08 g anionic surfactant (30% aqueous solution), and 3.10 g sodium carbonate. A monomer emulsion was formed containing 626.60 g water, 36.90 g anionic surfactant (30% aqueous solution), 654.67 g Butyl Acrylate, 350.00 g Methyl Methacrylate, and 15.10 g methacrylic acid. The kettle contents were heated to 85° C. A 55.80 g quantity of the monomer emulsion was added to the kettle to form a polymer seed. Then, 4.03 g ammonium persulfate (dissolved in 28 g water) was added to initiate polymerization. The monomer emulsion was fed into the kettle such that a reactor temperature of 85° C. was maintained. After monomer feeds were completed, the batch was cooled to 65° C., and upon reaching 65° C. 5.58 g ferrous sulfate (0.15% aqueous) was added to the reactor. Then, a 1.12 g quantity of 70% tert-butyl hydroperoxide in 20 g of water was added along with a 0.56 g quantity of isoascorbic acid in 20.00 g water. The temperature was reduced to below 45° C. The pH of the batch was raised to 7.5 using ammonium hydroxide (28% aqueous) and a bactericide (4.77 g Kathon LX (1.4% aqueous) with 6.20 g water) was added. The sample was filtered through a 100 mesh screen to remove any large pieces of coagulated material.

Example 15

A nanocomposite dispersion was prepared according to the polymerization method described in Reference Example 14 with 5% unmodified phyllosilicate clay (% based on weight on monomer charged) present in the reactor. After the 55.80 g monomer emulsion charge had been added to the kettle to form the polymer seed, the clay was introduced to the remaining monomer emulsion with vigorous agitation, and fed into the reactor.

Example 16

A blend of a latex prepared as in Reference Example 14 was homogenized with 5% phyllosilicate clay for I hour using a PRO250 homogenizer (manufactured by Pro Scientific Monroe, Conn.).

Application Test Results for Examples 14 to 16

Films of each of the "unformulated" coatings in Examples 14 to 16 were prepared. Tensile strength and elongation data for the unformulated coatings were collected using an Instron Model 1122 instrument (manufactured by Instron Corporation, Canton, Mass.). Samples were pulled at a rate of 5.08 cm/min. Sample data was calibrated for film thickness, width, and weight of each sample film. The initial distance between the clamps holding the sample being tested is 2.54 cm. Experiments were run in a controlled environment room with a temperature of 22° C. and a humidity level of 50%. Tensile measurements are provided in Table VIII.

TABLE VIII

Tensile Measurements of Nanocomposite Films

| Example | $Tensile_{max}$/Elongation lbs per inch/% | Tensile Strength/$Elongation_{max}$ lbs per inch/% |
|---|---|---|
| 14 (Control) | 211/920 | 21/3200 |
| 15 (In situ) | 517/660 | 501/740 |
| 16 (Blend) | 548/940 | 539/985 |

Formulated coatings were prepared using the dispersions of Examples 14 to 16 and tested for rheology modifier ("RM") demand, gloss, and average scrub resistance. RM demand was measured as the weight of rheology modifier needed per hundred pounds of formulated paint so that the formulated paint achieves a viscosity of approximately 90 KU units or 1.3 on the ICI viscosity scale. Gloss was measured from draw down charts at 20 degree and 60 degree angles according to ASTM D-523-89. Scrub resistance was measured according to ASTM D-2486-74A. These measurements are recorded in Table IX.

The results in Table IX indicate that RM demand of the formulated coatings prepared with the aqueous nanocomposite clay dispersions of Examples 15 and 16 have a much lower RM demand compared to formulated coatings prepared without clay, which is an improvement for some applications. The gloss results show that the in-situ-prepared nanocomposite dispersion of Example 15 provides the same or slightly higher gloss than the non-clay dispersion of Reference Example 14, while the blend-prepared dispersion of Example 16 provided lower gloss. In comparison to the average scrub resistance of formulated coatings prepared with the non-clay dispersion of Reference Example 14, the in-situ-prepared nanocomposite dispersion of Example 15 provides double the average scrub resistance, while the blend-prepared dispersion of Example 16 provides nearly triple the average scrub resistance.

TABLE IX

Properties of Nanocomposite Coatings

| Example | RM demand 2020npr[(a)]/8W[(b)] (lbs) | Gloss 20/60 | Average scrub |
|---|---|---|---|
| Ref. 14 | 25/3.8 | 20/64 | 320 |
| Ex. 15 (in-situ) | 10/0 | 20/67 | 645 |
| Ex. 16 (blend) | 20.4/0 | 9/52 | 926 |

[(a)]ACRYSOL (TM) RM-2020NPR, Rohm and Haas Company, Philadelphia, Pennsylvania
[(b)]ACRYSOL (TM) RM-8W, Rohm and Haas Company, Philadelphia, Pennsylvania Examples 17 to 21

Examples 17 to 21 indicate that various ways of preparing polymer-clay nanocomposite dispersions are possible using the processes of the present invention. In these examples, nanocomposite dispersions were prepared according to the polymerization of Reference Example 14 with PGV unmodified montmorillonite clay (provided by Nanocor, Inc., Arlington Heights, Ill.) using the following process variations:

1) Synthesis without homogenization (mechanical stirring only): Clay is typically added to the initial reactor water and dispersed with simple mechanical mixing both before and after seed formation. An emulsified monomer mixture containing no clay is typically subsequently co-fed into the reaction mixture to grow out the nanocomposite polymer particles.

2) Synthesis with clay added to the initial reactor water and using homogenization: An emulsified monomer mixture containing no clay is typically subsequently co-fed to grow out the nanocomposite polymer particles.

TABLE X

Various Methods of Clay Addition

| Ex # | Method of Clay Addition |
|---|---|
| Ref. 14 | — |
| 17 | Homogenized in emulsified monomer mixture water |
| 18 | Mechanical stirring, no homogenization, of 5% PGV clay in reactor water before polymer seed formation. |
| 18B (redox process) | 2.65 g of sodium hydrosulfite and 20 g DI water added to reactor after heating to 85° C. and before addition of 5% PGV clay in reactor water before polymer seed formation (mechanical stirring only). |
| 18C (staged acid) | Addition of 5% PGV clay to reactor water before polymer seed formation (mechanical stirring only). ½ of MAA (7.55 g) added to kettle after the PGV clay but before the 55.80 g of monomer emulsion seed is charged. The remainder of the MAA is added to the monomer emulsion as usual. |
| 18D (redox process and staged acid) | 2.65 g of sodium hydrosulfite and 20 g DI water added to reactor after heating to 85° C. and before addition of 5% PGV clay in reactor water before polymer seed formation (mechanical stirring only). ½ of MAA (7.55 g) added to kettle after the PGV clay but before the 55.80 g of monomer emulsion seed is charged. The remainder of the MAA is added to the monomer emulsion as usual. |
| 18E (staged acid then redox process) | Addition of 5% PGV clay to reactor water before polymer seed formation (mechanical stirring only). ½ of MAA (7.55 g) added to kettle after the PGV clay but before the 55.80 g of monomer emulsion seed is charged. 2.65 g of sodium hydrosulfite and 20 g DI water added to reactor after the staged acid and before the ammonium persulfate. The remainder of the MAA is added to the monomer emulsion as usual. |
| 19 | Mechanical stirring, no homogenization, of 5% PGV clay in reactor water after polymer seed formation. |
| 20 | 2% PGV clay homogenized in reactor water (before seed formation) |
| 21 | 5% PGV clay homogenized in reactor water (before seed formation) |

Tensile strength and elongation data of films prepared from unformulated coatings of nanocomposite dispersions made according to the above described process variations were collected on a Tinius Olsen Benchtop Universal Testing Machine (manufactured by Tinius Olsen Testing Machine Company, Willow Grove, Penn.). Films were pulled at a rate of 5.08 cm/min. Sample data was calibrated for film thickness, width, and weight of each sample film. The initial distance between the clamps holding the sample being tested is 2.54 cm. Experiments were run in a controlled environment room with a temperature of 22° C. and a humidity level of 50%. Tensile measurements are provided in the following table:

TABLE XI

| Tensile Measurements | | |
|---|---|---|
| Ex # | Clay Level & Type | $Tensile_{max}$/ Elongation |
| Ref. 14 | No clay | 58.8 psi/1067% |
| 17 | 5% PGV | 84.9 psi/1085% |
| 18 | 5% PGV | 84.0 psi/1110% |
| 18B | 5% PGV | 205.0 psi/947% |
| 18C | 5% PGV | 186.4 psi/948% |
| 18D | 5% PGV | 245.0 psi/1136% |
| 18E | 5% PGV | 167.0 psi/1283% |
| 19 | 5% PGV | 78.8 psi/1163% |
| 20 | 2% PGV | 84.0 psi/1253% |
| 21 | 5% PGV | 109.3 psi/1225% |

[1]Average of the values 29.2 psi/3180% and 75 psi/1578%
$Tensile_{max}$ values are +/−3 psi.

As Table XI illustrates, the polymer clay nanocomposite compositions, in which a reduction-oxidation reaction was fostered using the reduction of Fe within the clay to form radicals such as in Example 18B and in which the reduction-oxidation reaction was fostered along with a staged acid approach such as in Example 18D, displayed dramatic improvements in tensile properties in comparison with polymers and polymer clay nanocomposite compositions polymerized from the same monomers.

Example 22

A 98.1 BA/1.9 MAA latex was synthesized via the following method: To an empty reactor kettle was added 650.00 g DI water, 26.30 g polymer preform (45% solids latex), and 0.90 g sodium carbonate. A monomer emulsion was formed using 1200.00 g water, 17.90 g anionic surfactant (23% aqueous solution), 1748.00 g Butyl Acrylate, and 32.60 g methacrylic acid. The kettle contents were heated to 85° C. Then, 7.60 g ammonium persulfate and 1.90 g sodium carbonate (dissolved in a total of 182.00 g water) was added gradually to initiate polymerization. The monomer emulsion was fed into the kettle such that a reactor temperature of 85° C. was maintained. After feeds were completed, the batch was cooled to 65° C., and upon reaching 65° C., a 0.80 g quantity of ferrous sulfate (0.15% aqueous) was added to the reactor along with 1.20 g of versene (0.1% aqueous). Then, a 4.00 g quantity of 70% tert-butyl hydroperoxide in 45 g of water was added along with a 2.00 g quantity of sodium sulfoxylate formaldehyde in 45.00 g water. The temperature was then lowered to below 45° C. The pH of the batch was raised to 7.5 using ammonium hydroxide (28% aqueous) and a bactericide (4.90 g Kathon LX (1.4% aqueous) with 5.00 g water) was added. The sample was then filtered through a 100 mesh screen to isolate any large pieces of coagulated material.

Example 23

A nanocomposite dispersion was synthesized according to the process of Example 22, with the addition of 2% unmodified phyllosilicate clay (% by weight on monomer charged) present in the reactor. The clay was introduced to the monomer emulsion with vigorous agitation, and fed into the reactor.

Example 24

A blend of a latex prepared as in Example 22 was homogenized with 2% unmodified phyllosilicate clay for 1 hour using a PRO250 homogenizer (Pro Scientific Monroe, Conn.) to prepare an admixed nanocomposite dispersion.

Application Test Results for Examples 22 to 24

The aqueous nanocomposite dispersions of examples 22 to 24 were tested as pressure sensitive adhesives according to the following methods: Peel: PSTC-1 Peel Adhesion of Single Coated Pressure Sensitive Tapes at 180° Angle (PSTC=Pressure Sensitive Tape Council, 401 N. Michigan Avenue, #00, Chicago, Ill. 60611). Loop Tack: ASTM D6195 Standard Test Methods for Loop Tack. Shear: ASTM D6463 Standard Test Methods for Time to Failure of Pressure Sensitive Articles under Sustained Shear Loading using either 1"×1"×1 kg (2.54 cm×2.54 cm×1 kg) or 0.5"×1"×1 kg (1.27 cm×2.54 cm×1 kg) test geometry. The PSA properties are provided in Table XII.

TABLE XII

| Properties of Nanocomposite Pressure Sensitive Adhesives | | | | | |
|---|---|---|---|---|---|
| | 180° Peel SS | | Shear 0.5" × 1", 1 kg | Loop Tack | |
| Example | (oz./in) | (N/12.7 mm) | hrs | (oz.) | (N) |
| 22 (Control) | 24.0 | 6.7 | 6.7 | 36.7 | 10.2 |
| 23 (In situ) | 22.8 | 6.3 | 14.2 | 35.2 | 9.8 |
| 24 (Blend) | 18.8 | 5.2 | 10.5 | 24.9 | 6.9 |

Examples 25 to 28

Dirt Pickup Resistance of Coatings

Coatings prepared according to the present invention as well as commercially-available comparative coatings were applied to concrete roof tiles and tested for dirt pickup resistance. Aqueous nanocomposite dispersions for the roofing tile formulations were prepared according to the processes described in Example 15 (aqueous nanocomposite dispersion prepared with in-situ clay) and Reference Example 14 (no clay dispersion), denoted respectively Example 25 and Reference Example 26. These dispersions were prepared with the following monomer amounts: 452.25 g BA, 537.68 g MMA, and 15.10 g MAA to provide polymers having a comonomer ratio of 45.0 BA/53.5 MMA/1.5 MAA. Concrete formulations and preparation of formulated samples from each of the nanocomposite and reference dispersions follow those described, for example, in U.S. Pat. No. 5,718,943.

ASTM Standard Test No. D3719-78 was modified as follows for testing the roofing tile coatings: Formulated coatings were drawn down with a 4 mil bar on an aluminum panel. The films were dried overnight. Mapico 422 iron oxide slurry was brushed onto the films. The slurry coated panels were air dried, then placed into a 140° F. oven for one hour. The panels were then allowed to return to room temperature. The panels were washed under tepid water while lightly rubbing and evenly with a cheesecloth pad. After air drying the films were evaluated for dirt pickup resistance (DPUR), and rated on a 0-10 scale; 0 being no removal of iron oxide or no dirt pickup resistance and 10 being complete removal of iron oxide or outstanding dirt pickup resistance. The DPUR results (Table XIII) show that the coating prepared with nanocomposite clay dispersion (Example 25) had a significantly better DPUR than a similar reference coating which was not prepared with clay (Reference Example 26) as well as comparable commercial coatings (Comparative Examples 27 and 28).

TABLE XIII

DPUR of Coatings

| Source of Aqueous Dispersion for Formulated Coatings | DPUR Rating |
|---|---|
| Example 25 | 8.5 |
| Reference Example 26 | 7.0 |
| Comparative Example 27 PRIMAL (TM)[a] MRB-102K, no clay | 6.0 |
| Comparative Example 28 PRIMAL (TM)[a] MLT#4, no clay | 5.0 |

[a]PRIMAL is a trademark of Rohm and Haas Company, Philadelphia, Pennsylvania.

Example 29

Redox Process Feed

A latex is synthesized via the following method. An empty reactor kettle is charged with 436.00 g DI water, 24.40 g of PGV sodium montmorillonite clay, 5.08 g anionic surfactant (30% aqueous solution), and 3.10 g sodium carbonate. In a separate vessel, a monomer emulsion is formed containing 626.60 g water, 36.90 g anionic surfactant (30% aqueous solution), 654.67 g Butyl Acrylate, 350.00 g Methyl Methacrylate, and 15.10 g methacrylic acid. The kettle contents are heated to 85° C. A 55.80 g quantity of the monomer emulsion is added to the kettle to form a polymer seed. Through three spatially separated inlets, the monomer emulsion is fed into the kettle along with an aqueous solution of 2.0 g of 70% tert-butyl hydroperoxide in 40 g of water and 2 g of isoascorbic acid in 40 g of water such that a reactor temperature of 65° C. was maintained. After the monomer feeds are completed, 5.58 g ferrous sulfate (0.15% aqueous) is added to the reactor. Then, a 1.12 g quantity of 70% tert-butyl hydroperoxide in 20 g of water is added along with a 0.56 g quantity of isoascorbic acid in 20.00 g water. The temperature is reduced to below 45° C. The pH of the batch is raised to 7.5 using ammonium hydroxide (28% aqueous) and a bactericide (4.77 g Kathon LX (1.4% aqueous) with 6.20 g water) is added. The sample is filtered through a 100 mesh screen to remove any large pieces of coagulated material. The resultant polymer clay nanocomposite may exhibit a higher degree of film clarity than nanocomposites or polymers that do not include the redox process.

We claim:

1. A core-shell nanocomposite polymer composition comprising:

(a) a first stage core polymer, and (b) a second stage nanocomposite shell comprising at least 10 parts of an at least partially exfoliated unmodified clay and up to 90 parts of a polymer derived from at least one ethylenically unsaturated monomer unit.

2. The core-shell nanocomposite polymer composition according to claim 1, wherein the second stage nanocomposite shell comprises:

(i) from 10 to 20 parts of an at least partially exfoliated unmodified clay, and (ii) from 80 to 90 parts of a polymer polymerized from at least one ethylenically unsaturated monomer.

3. The core-shell nanocomposite polymer composition according to claim 2, wherein the (ii) polymer is polymerized from at least one or more monomers selected from the group consisting of $C_1$-$C_{18}$ alkyl (meth)acrylate, 2-ethylhexyl (meth)acrylate, isobornyl (meth)acrylate, lauryl (meth)acrylate, allyl (meth)acrylate, stearyl (meth)acrylate, acrylic acid, itaconic acid, methacrylic acid, ethylene, hydroxyethyl(meth)acrylate, hydroxypropyl(meth)acrylate, butadiene, vinyl acetate, vinyl versatate, styrene, vinyl aromatic monomers, divinylbenzene, divinylpyridine, divinyltoluene, diallyl phthalate, ethylene glycol di(meth)acrylate, butylene glycol di(meth)acrylate, divinylxylene, divinylethylbenzene, divinylsulfone, divinylketone, divinylsulfide, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N-methylene dimethacrylamide, N,N-methylene dimethacrylamide, N,N-ethylenediacrylamide, trivinylbenzene, and the polyvinyl ethers of glycol, glycerol, pentaerythritol, resorcinol, monothio and dithio derivatives of glycols, and combinations thereof.

4. The core-shell nanocomposite polymer composition according to claim 2, wherein the at least one clay is selected from the group consisting of smectite, phyllosilicate, montmorillonite, saponite, beidellite, montronite, hectorite, stevensite, vermiculite, kaolinite, hallosite, synthetic phyllosilicates, and combinations thereof.

5. A process for preparing an aqueous nanocomposite dispersion comprising the steps of:

providing an aqueous emulsion comprising a plurality of polymer seeds having a mean particle diameter ranging from 20 to 500 nanometers, wherein said polymer seeds are present in said emulsion in an amount ranging from 0.1 to 10% based on dry weight of total dry polymer weight in said nanocomposite dispersion;

providing a monomer mixture comprising at least one ethylenically unsaturated monomer wherein at least one of the ethylenically unsaturated monomer is an acid containing monomer;

combining the monomer mixture and the aqueous emulsion;

adding an aqueous dispersion to said aqueous emulsion, wherein said aqueous dispersion comprises 0.1 to 20% based on dry weight of total dry polymer weight in said nanocomposite of at least one unmodified clay; and polymerizing at least a portion of the monomer to form a polymer clay nanocomposite dispersion.

6. A process for preparing an aqueous nanocomposite dispersion comprising the steps of:

providing an aqueous emulsion comprising a plurality of polymer seeds having a mean particle diameter ranging from 20 to 500 nanometers, wherein said polymer seeds are present in said emulsion in an amount ranging from 0.1 to 10% based on dry weight of total dry polymer weight in said nanocomposite dispersion;

providing a monomer mixture comprising at least one ethylenically unsaturated monomer;

combining the monomer mixture and the aqueous emulsion;

adding an aqueous dispersion to said aqueous emulsion, wherein said aqueous dispersion comprises 0.1 to 20% based on dry weight of total dry polymer weight in said nanocomposite of at least one unmodified clay; and polymerizing at least a portion of the monomer to form a polymer clay nanocomposite dispersion wherein the glass transition temperature of the polymer within the polymer clay nanocomposite dispersion is in the range of from −80° C. to 50° C.

7. A process for preparing an aqueous nanocomposite dispersion comprising the steps of:

providing an aqueous emulsion comprising a plurality of polymer seeds having a mean particle diameter ranging from 20 to 500 nanometers, wherein said polymer seeds are present in said emulsion in an amount ranging from 0.1 to 10% based on dry weight of total dry polymer weight in said nanocomposite dispersion;

providing a monomer mixture comprising at least one ethylenically unsaturated monomer;

combining the monomer mixture and the aqueous emulsion;

adding an aqueous dispersion to said aqueous emulsion, wherein said aqueous dispersion comprises 0.1 to 20% based on dry weight of total dry polymer weight in said nanocomposite of at least one unmodified clay; and polymerizing at least a portion of the monomer to form a polymer clay nanocomposite dispersion, wherein the aqueous dispersion is added to the emulsion on a gradual basis during the polymerization step.

8. The process according to claim 5, 6, or 7, wherein said polymer seeds are formed in the same reactor vessel in which said monomer is polymerized.

9. The process according to claim 8, wherein said polymer seeds comprise 0.1% to 200% based on dry weight of a layered clay.

10. The process according to claim 5, 6, or 7 wherein said polymer seeds are introduced to said reactor vessel wherein said monomer is polymerized.

11. The process according to claim 5, 6, or 7, wherein said polymer seeds comprise 0.1% to 20% based on dry weight of a layered clay.

12. The process according to claim 5 or 7, wherein the glass transition temperature of said polymer within the polymer clay nanocomposite dispersion is in the range of from −80° C. to 140° C.

13. The process according to claim 5 or 7, wherein the glass transition temperature of said polymer within the polymer clay nanocomposite dispersion is in the range of from −80° C. to 50° C.

14. The process according to claim 5, 6, or 7, wherein at least one ethylenically unsaturated monomer is selected from the group consisting of: $C_1$-$C_{18}$ alkyl (meth)acrylate, 2-ethylhexyl (meth)acrylate, isobornyl (meth)acrylate, lauryl (meth)acrylate, allyl (meth)acrylate, stearyl (meth)acrylate, acrylic acid, itaconic acid, methacrylic acid, butadiene, vinyl acetate, vinyl versatate, ethylene, styrene, vinyl aromatic monomers, divinylbenzene, divinylpyridine, divinyltoluene, diallyl phthalate, ethylene glycol dia(meth)crylate, butylene glycol di(meth)acrylate, divinylxylene, divinylethylbenzene, divinylsulfone, divinylketone, divinylsulfide, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N-methylene dimethacrylamide, N,N-methylene dimethacrylamide, N,N-ethylenediacrylamide, trivinylbenzene, and the polyvinyl ethers of glycol, glycerol, pentaerythritol, resorcinol, monothio and dithio derivatives of glycols, and combinations thereof.

15. The process according to claim 5, 6, or 7, wherein the at least one clay is selected from the group consisting of smectite clay, phyllosilicate, montmorillonite, saponite, beidellite, montronite, hectorite, stevensite, vermiculite, kaolinite, hallosite, synthetic phyllosilicates and combinations thereof.

16. A coating, adhesive, caulking, or sealant product comprising the aqueous nanocomposite dispersion prepared according to the process of claim 5, 6, or 7.

17. The process according to claim 5, 6, or 7, wherein the aqueous dispersion comprises a redox-active multivalent metal ion.

18. The process according to claim 17, wherein an oxidant is added to the clay dispersion.

19. The process according to claim 17, wherein a reductant is added to the clay dispersion.

20. The process according to claim 17, wherein an oxidant and a reductant is added to the clay dispersion.

* * * * *